United States Patent
Van Bommel et al.

(10) Patent No.: US 12,311,601 B2
(45) Date of Patent: May 27, 2025

(54) FDM MANUFACTURED LIGHT REFLECTIVE SURFACES

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 53 days.

(21) Appl. No.: 18/035,893

(22) PCT Filed: Nov. 9, 2021

(86) PCT No.: PCT/EP2021/081048
§ 371 (c)(1),
(2) Date: May 8, 2023

(87) PCT Pub. No.: WO2022/101174
PCT Pub. Date: May 19, 2022

(65) Prior Publication Data
US 2024/0009926 A1 Jan. 11, 2024

(30) Foreign Application Priority Data
Nov. 13, 2020 (EP) ..................................... 20207366

(51) Int. Cl.
*B29C 64/336* (2017.01)
*B29C 64/118* (2017.01)
(Continued)

(52) U.S. Cl.
CPC .......... *B29C 64/336* (2017.08); *B29C 64/118* (2017.08); *B33Y 10/00* (2014.12);
(Continued)

(58) Field of Classification Search
CPC ..... B29C 64/336; B29C 64/118; B33Y 70/10; B33Y 10/00; B33Y 80/00; F21V 7/24; B29L 2031/747
See application file for complete search history.

(56) References Cited

U.S. PATENT DOCUMENTS

2019/0210278 A1  7/2019  Hikmet et al.
2020/0114572 A1  4/2020  Hikmet et al.

FOREIGN PATENT DOCUMENTS

EP   17182295  *  7/2017  ........... B29C 64/118
EP   18192205  *  9/2018  ........... B29C 64/118
(Continued)

*Primary Examiner* — Christopher M Rodd
*Assistant Examiner* — Shibin Liang

(57) ABSTRACT

The invention provides a method for producing a 3D item by depositing 3D printable material, wherein the 3D printable material comprises core material and 3D printable shell material. The core material is one or more of (i) reflective, (ii) transmissive, (iii) absorbing, and (iv) luminescent for light having a wavelength in the visible wavelength range. The 3D printable shell material is transmissive for the wavelength in the visible wavelength range. A printed core-shell layer has a layer width (W) and a layer height and a first aspect ratio AR1, wherein AR1=W/H and wherein AR1>1. A cross-sectional plane of the core-shell layer comprises the layer width (W) and the layer height, and the core (330) provides a core cross-section having a first dimension (A1), which is the longest dimension of the core cross-section, and a second dimension ($A_2$) perpendicular to the first dimension (A1), providing a second aspect ratio $AR_2$, wherein $AR_2=A1/A_2$, wherein $2=<AR_2=<10,000$; and wherein $AR_2/AR1>=1.5$, wherein the core (330) comprises two or more strip-like elements (337), wherein each of the two or more strip-like elements (337) has an element length ($L_E$) individually selected from the range of at least the layer width (Continued)

(W), wherein $L_E \geq *A1$, and wherein the spacing distance (S) between two neighboring strip-like elements $S = <10*L_E$.

7 Claims, 7 Drawing Sheets

(51) Int. Cl.
*B33Y 10/00* (2015.01)
*B33Y 70/10* (2020.01)
*B33Y 80/00* (2015.01)
*F21V 7/24* (2018.01)
*B29L 31/00* (2006.01)

(52) U.S. Cl.
CPC .............. *B33Y 70/10* (2020.01); *B33Y 80/00* (2014.12); *F21V 7/24* (2018.02); *B29L 2031/747* (2013.01)

(56) References Cited

FOREIGN PATENT DOCUMENTS

| | | |
|---|---|---|
| EP | 3463816 A1 | 4/2019 |
| EP | 3664989 A1 | 6/2020 |
| WO | 2019201671 A1 | 10/2019 |
| WO | 2020048889 A1 | 3/2020 |

\* cited by examiner

FDM MANUFACTURED LIGHT REFLECTIVE SURFACES

CROSS-REFERENCE TO PRIOR APPLICATIONS

This application is the U.S. National Phase application under 35 U.S.C. § 371 of International Application No. PCT/EP2021/081048, filed on Nov. 9, 2021, which claims the benefit of European Patent Application No. 20207366.4, filed on Nov. 13, 2020. These applications are hereby incorporated by reference herein.

FIELD OF THE INVENTION

The invention relates to a method for manufacturing a 3D (printed) item. Further, the invention may relate to a software product for executing such method. The invention also relates to the 3D (printed) item obtainable with such method. Further, the invention relates to a lighting device including such 3D (printed) item. Yet further, the invention may also relate to a 3D printer, such as for use in such method.

BACKGROUND OF THE INVENTION

The 3D printing articles including spatially different properties are known in the art. PCT/2015/034843, for instance, describes a method of printing a 3D article comprising selectively depositing a first portion of build material in a fluid state onto a substrate to form a first region of build material; selectively depositing a first portion of support material in a fluid state to form a first region of support material; and selectively depositing a second portion of build material in a fluid state to form a second region of build material, wherein the first region of support material is disposed between the first region of build material and the second region of build material in a z-direction of the article. In some cases, the first region of support material forms a grayscale pattern and/or a CMY color pattern in combination with the first region of build material and/or the second region of build material.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals, and polymers. 3D printing can also be used in producing molds which can then be used for replicating objects.

For the purpose of making molds, the use of polyjet technique has been suggested. This technique makes use of layer by layer deposition of photo-polymerizable material which is cured after each deposition to form a solid structure. While this technique produces smooth surfaces the photo curable materials are not very stable, and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast, low cost and can be used for printing complicated 3D objects. Such printers are used in printing various shapes using various polymers. The technique is also being further developed in the production of LED luminaires and lighting solutions.

It appears desirable (to be able) to produce items, such as luminaires, with controllable optical properties, or even spatially different optical properties. This may be desirable for controlling light distributions, to create light effects, for distinguishing surfaces, etc.

Hence, it is an aspect of the invention to provide an alternative 3D printing method and/or 3D (printed) item which preferably further at least partly obviate(s) one or more of above-described drawbacks. The present invention may have as object to overcome or ameliorate at least one of the disadvantages of the prior art, or to provide a useful alternative.

In a first aspect, the invention provides a method for producing a 3D item by means of fused deposition modelling. Especially, the method may comprise a 3D printing stage comprising layer-wise depositing an extrudate comprising 3D printable material on a receiver item, to provide the 3D item of 3D printed material. In embodiments, during at least part of the 3D printing stage the 3D printable material comprises core material and 3D printable shell material, to provide the 3D item comprising a core-shell layer of the 3D printed material, wherein the core-shell layer comprises (i) a core comprising core material and (ii) a shell comprising 3D printed shell material. In embodiments, the shell partly or fully encloses the core. Especially, in embodiments, the shell may fully enclose the core. In embodiments, the core material is one or more of (i) reflective, (ii) transmissive, (iii) absorbing, and (iv) luminescent for light having a wavelength in the visible wavelength range (i.e. within the range of 380-780 nm). In embodiments, the core material may be light reflective for the wavelength in the visible wavelength range. Especially, the core material may be specular reflective for the wavelength in the visible wavelength range. In embodiments, the core material may be light transmissive for the wavelength in the visible wavelength range. Additionally or alternatively, the core material may be light absorbing for the wavelength in the visible wavelength range. In embodiments, the core material may be luminescent for light having a wavelength in the visible wavelength range. In embodiments, the 3D printable shell material may be transmissive for the wavelength in the visible wavelength range. Especially, the 3D printable shell material may be transparent for the wavelength in the visible wavelength range. The core-shell layer has a layer width (W) and a layer height (H) and a first aspect ratio $AR_1$, wherein $AR_1=W/H$. In embodiments $AR_1 \geq 1$, such as $AR_1 > 1$, like at least 1.2. A cross-sectional plane of the core-shell layer comprising the layer width (W) and the layer height (H), and the core, provides a core cross-section, comprising a first dimension ($A_1$), which is the longest dimension of the core cross-section, and a second dimension ($A_2$), perpendicular to the first dimension ($A_1$), wherein the first dimension ($A_1$) is the longest dimension of the core, in the cross-sectional plane perpendicular to the printing direction. The first dimension ($A_1$) and the second dimension ($A_2$) provide a second aspect ratio $AR_2$, wherein $AR_2=A_1/A_2$. In specific embodiments, $2 \leq AR_2 \leq 10,000$. In specific embodiments, $AR_2/AR_1 \geq 1.2$, especially, $AR_2/AR_1 \geq 1.5$, more especially $AR_2/AR_1 \geq 2$. Hence, in specific embodiments the invention provides a method for producing a 3D item by means of fused deposition modelling, the method comprising a 3D printing stage, wherein the 3D printing stage comprises layer-wise depositing 3D printable material to provide the 3D item comprising 3D printed material on a receiver item, wherein: (a) during at least part of the 3D printing stage the 3D printable material comprises core material and 3D printable shell material; wherein the 3D item comprises a core-shell layer of the 3D printed material, wherein the core-shell layer comprises (i) a core comprising core material and (ii) a shell comprising 3D printed shell material; wherein the shell at least partly encloses the core; (b) the core material is one or more of (i) reflective, (ii) transmissive, (iii) absorbing, and (iv) luminescent for light having a wavelength in the visible wavelength range; (c) the 3D printable shell material is transmissive for the wavelength in the visible wavelength range; (d) the core-shell layer has a layer width (W) and a layer height (H) and a first aspect ratio $AR_1$, wherein $AR_1=W/H$, wherein especially $AR_1>1$; (e) a cross-sectional plane of the core-shell layer, wherein the cross-sectional plane comprises the layer width (W) and the layer height (H), and the core provide a core cross-section, wherein the core cross-section has a first dimension ($A_1$), which is the longest dimension of the core cross-section, and a second dimension ($A_2$), perpendicular to the first dimension (A1), providing a second aspect ratio $AR_2$, wherein $AR_2=A_1/A_2$, wherein in specific embodiments $2 \leq AR_2 \leq 10,000$; and (f) wherein in specific embodiments $AR_2/AR_1 \geq 1.5$.

In this way, it may be possible to create one or more of (i) decorative, and (ii) optical effects that may differ over the 3D printed item (surface). In principle, in embodiments with a single type of printing material (e.g. a combination of (a) core material and (b) shell material) it may be possible to create one or more 3D printed parts that have such an effect that may differ from one or more other parts, whereas the material composition may substantially, or even essentially, be the same (over all these parts). This may allow a relatively simple 3D printing method but may also add to the controllability of local material properties of the 3D printed item. Especially, selecting non-3D printable material as core material may provide specular reflective properties which may not easily be possible with 3D printable polymeric material. Further, non-3D printable core material may comprise a larger second aspect ratio ($AR_2$) compared to 3D printable core material, which may allow a better tuning of the optical properties.

In embodiments, the core material comprises a material that may be incorporated in the 3D printed (shell) material, although the core material itself may not comprise 3D printable material per se. In alternative embodiments, the core material may comprise 3D printable material. A combination may also be possible.

In embodiments, the shell material comprises 3D printable material. Materials that may especially qualify as 3D printable materials will be discussed in more detail below.

In embodiments the 3D printable shell material (and thus the 3D printed shell material), especially a thermoplastic material comprised by the 3D printable shell material, may be light transmissive for at least part of the light having one or more wavelengths in the visible range.

Alternatively or additionally, in embodiments the 3D printable shell material (and thus the 3D printed shell material), especially the thermoplastic material, may be light transmissive for at least part of the light having one or more wavelengths in the visible range, but may also be light reflective for (the) light having one or more wavelengths in the visible range. Especially, in embodiments the shell material may be light transparent (for visible light).

Assuming that the printable shell material (and thus the 3D printed shell material) is transmissive for one or more wavelengths in the visible, reflection and/or absorption of light at the core may also be visible. Therefore, in specific embodiments the core material may be one or more of absorbing or reflecting. However, in other (specific) embodiments, the core material may (also) be light transmissive.

In specific embodiments, the core material may be transmissive and may comprise light reflective particles (which may be dispersed in the light transmissive thermoplastic core material. In other embodiments, the core material may comprise a support, which may be light transmissive, light absorbing, and/or light reflective, and on one or more surfaces of support, light reflective particles may be provided. Especially, in embodiments wherein the core material is substantially reflective, such as a reflective strip-like element, a support with reflective particles, or a light transmissive core comprising reflective particles, the core material may essentially be specular reflective. Hence, in embodiments wherein reflective particles are applied, especially these particles may have flake-like shapes. These particles may be specular reflective. Hence, in specific embodiments, the core may be specular light reflective for the wavelength in the visible wavelength range. Embodiments of core composition will be discussed in more detail below.

Alternatively or additionally, the core material may be colored and/or the material may comprise a colorant, such as a dye or pigment.

Additionally or alternatively, the core material may be luminescent for light having a wavelength in the visible wavelength range.

Therefore, in embodiments the printable shell material may be light transmissive, especially light transparent, for one or more wavelengths in the visible wavelength rage. Especially, in embodiments the printable shell material is light transparent for one or more of the one or more wavelengths that are reflected or absorbed by the 3D printable core material. Thus, in specific embodiments, the printable shell material is light transmissive, especially light transparent for one or more wavelengths in the visible, especially for those one or more wavelengths in the visible that may be reflected or absorbed by the core material.

Here, the phrases "a wavelength in the visible wavelength range" "the wavelength" or "one or more wavelengths", and similar phrases, may especially indicate one wavelength or multiple wavelengths. Hence, the terms "a wavelength" or "the wavelength" in phrases like "transparent for a wavelength" or "transmissive for the wavelength", or "reflective for the wavelength", and similar phrases, may especially refer to a plurality of wavelengths, such as a wavelength range of at least 100 nm, especially a wavelength range of at least 250 nm, such as a wavelength range of at least 300 nm (within the range of 380-780 nm).

Especially, in embodiments a light transmissive material has a light transmission in the range of 50-100%, especially in the range of 70-100%, for light having a wavelength selected from the visible wavelength range. Herein, the term "visible light" especially relates to light having a wavelength selected from the range of 380-780 nm.

Hence, for instance, the shell may be transparent for wavelengths in a wavelength range of at least 100 nm (within the visible wavelength range). Hence, at any wavelength in the range, the shell may be transparent. For instance, at any wavelength in the range, the transmission may be at least 50%.

Especially, a light absorbing material has a light absorbance in the range of 50-100%, especially in the range of 70-100%, for light having a wavelength selected from the visible wavelength range. As can be derived from the above, this may apply for a wavelength range of at least 100 nm, especially a wavelength range of at least 250 nm, such as a wavelength range of at least 300 nm (within the range of 380-780 nm).

Especially, a light reflective material has a light reflectivity in the range of 50-100%, especially in the range of 70-100%, for light having a wavelength selected from the visible wavelength range. As can be derived from the above, this may apply for a wavelength range of at least 100 nm, especially a wavelength range of at least 250 nm, such as a wavelength range of at least 300 nm (within the range of 380-780 nm).

Note that a material may be reflective for one or more first wavelengths and absorb one or more second wavelengths, which may be the case with colored material. Herein, the term "light absorbing material" especially refers to a colored material or to a black material. The term "light reflective material may herein especially refer to a white material or metallic reflective material, i.e. materials which have a relatively high reflection, such as at least 70%, over a relatively high wavelength range, such as at least 100 nm, even more especially at least 250 nm, such as at least 300 nm, within the range of 380-780 nm.

The transmission T (or light permeability) can be determined by providing light at a specific wavelength with a first intensity $I_1$ to the light transmissive material under perpendicular radiation and relating the intensity of the light $I_2$ at that wavelength measured after transmission through the material, to the first intensity of the light provided at that specific wavelength to the material, thus $T=I_2/I_1$. Likewise, the reflectivity R can be determined by relating the intensity of the light $I_3$ at that wavelength measured after reflection by the material, to the first intensity of the light $I_1$ provided at that specific wavelength to the material. Thus $R=I_3/I_1$. The absorbance A may in embodiments be defined as $A=1-(T+R)$ (see also E-208 and E-406 of the CRC Handbook of Chemistry and Physics, 69th edition, 1088-1989).

In specific embodiments, a material may be considered transmissive when the transmission of the radiation at a wavelength or in a wavelength range is larger than the reflectivity and absorbance (at that wavelength or in that wavelength range), thus when T>R and T>A, especially wherein $T/R \geq 1.2$ and $T/A \geq 1.2$. In specific embodiments, a material may be considered reflective when the reflectivity of the radiation at a wavelength or in a wavelength range is larger than the transmission and absorbance (at that wavelength or in that wavelength range), thus when R>T and R>A, especially wherein $R/T \geq 1.2$ and $R/A \geq 1.2$. In specific embodiments, a material may be considered absorbing when the absorbance of the radiation at a wavelength or in a wavelength range is larger than the transmission and reflectivity (at that wavelength or in that wavelength range), thus when A>T and A>R, especially wherein $A/T \geq 1.2$ and $A/R \geq 1.2$. Here, T, R, and A refer to percentages.

In specific embodiments, a material may be considered transmissive when the transmission of the radiation at a wavelength or in a wavelength range, especially at a wavelength or in a wavelength range of radiation generated by a source of radiation as herein described, through a 1 mm thick layer of the material, especially even through a 5 mm thick layer of the material, under perpendicular irradiation with said radiation is at least about 20%, such as at least 40%, like at least 60%, such as especially at least 80%, such as at least about 85%, such as even at least about 90%.

The light transmissive material has light guiding or wave guiding properties. Hence, the light transmissive material is herein also indicated as waveguide material or light guide material. The light transmissive material will in general have (some) transmission of one or more of (N)UV, visible and (N)IR radiation, such as in embodiments at least visible light, in a direction perpendicular to the length of the light transmissive material.

The transmission of the light transmissive material (as such) for one or more luminescence wavelengths may be at least 80%/cm, such as at least 90%/cm, even more especially at least 95%/cm, such as at least 98%/cm, such as at least 99%/cm. This implies that e.g. a 1 $cm^3$ cubic shaped piece of light transmissive material, under perpendicular irradiation of radiation having a selected luminescence wavelength (such as a wavelength corresponding to an emission maximum of the luminescence of the luminescent material of the light transmissive material), will have a transmission of at least 95%.

Herein, values for transmission especially refer to transmission without taking into account Fresnel losses at interfaces (with e.g. air). Hence, the term "transmission" especially refers to the internal transmission. The internal transmission may e.g. be determined by measuring the transmission of two or more bodies having a different width over which the transmission is measured. Then, based on such measurements the contribution of Fresnel reflection losses and (consequently) the internal transmission can be determined. Hence, especially, the values for transmission indicated herein, disregard Fresnel losses.

In embodiments, an anti-reflection coating may be applied to the luminescent body, such as to suppress Fresnel reflection losses (during the light incoupling process).

In addition to a high transmission for the wavelength(s) of interest, also the scattering for the wavelength(s) may especially be low. Hence, the mean free path for the wavelength of interest only taking into account scattering effects (thus not taking into account possible absorption may be at least 0.5 times the length of the body, such as at least the length of the body, like at least twice the length of the body. For instance, in embodiments the mean free path only taking into account scattering effects may be at least 5 mm, such as at least 10 mm. The wavelength of interest may especially be the wavelength at maximum emission of the luminescence of the luminescent material. The term "mean free path" is especially the average distance a ray will travel before experiencing a scattering event that will change its propagation direction.

In embodiments, the element comprising the light transmissive material may essentially consist of the light transmissive material. In specific embodiments, the element comprising the light transmissive material may be a light transparent element. Especially, the light transmittance is similar for all wavelengths in the visible wavelength range.

Especially, the light transmissive element, such as the light transparent element, may in embodiments have an absorption length and/or a scatter length of at least the length (or thickness) of the light transmissive element, such as at least twice the length of the light transmissive element. The absorption length may be defined as the length over which the intensity of the light along a propagation direction due to absorption drops with 1/e. Likewise, the scatter length may be defined as the length along a propagation direction along which light is lost due to scattering and drops thereby with a factor 1/e. Here, the length may thus especially refer to the distance between a first face and a second face of the light transmissive element, with the light transmissive material configured between the first face and second face.

Herein, when an element is indicated to be transmissive this may in embodiments imply that at one or more wavelengths the part of the radiation that is transmitted may be larger than the part of the radiation that is reflected or absorbed. Herein, when an element is indicated to be reflective this may in embodiments imply that at one or more wavelengths the part of the radiation that is reflected may be larger than the part of the radiation that is transmitted or absorbed.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion.

The first aspect ratio ($AR_1$) may depend on printing conditions. For instance, a layer may be more flattened, thus having a smaller layer height (H), when more pressure is applied with the nozzle on the receiver item during printing. In embodiments, the first aspect ratio ($AR_1$) may be selected from the range of $1 \leq AR_1 \leq 5$, such as $1 \leq AR_1 \leq 3$, especially $1 \leq AR_1 \leq 2$.

In embodiments of the invention, the cross-section of the core has an elongated shape. In this way, controlling the orientation of the core relative to the layer may provide control over optical properties of the layer. Therefore, in embodiments the second aspect ratio ($AR_2$) may be selected from $AR_2 \geq 2$, like $AR_2 \geq 3$, especially $AR_2 \geq 4$, more especially $AR_2 \geq 5$.

Especially, the aspect ratio of the core cross-section (second aspect ratio $AR_2$) may be larger than the aspect ratio of the layer cross-section (first aspect ratio $AR_1$). Hence, the ratio $AR_2/AR_1$ may be selected from $AR_2/AR_1 \geq 1.2$, especially $AR_2/AR_1 \geq 1.5$, more especially $AR_2/AR_1 \geq 2$, like $AR_2/AR_1 \geq 5$.

As mentioned above, non-3D printable core material may comprise a larger second aspect ratio ($AR_2$) compared to 3D printable core material, which may allow a better tuning of the optical properties. Hence, non-3D printable, high aspect ratio materials may be incorporated in the core.

In specific embodiments, the core (material) may comprise strip-like elements. The strip-like elements may be defined as relatively flat, elongated elements, such as (parts of) a ribbon or strip. Such strip-like elements may be incorporated in the 3D printable shell material. In this way, the strip-like elements may essentially be the core. Such strip-like elements may especially provide the core with large second aspect ratios ($AR_2$), such as $AR_2 \geq 3$, especially $AR_2 \geq 4$, more especially $AR_2 \geq 5$, like $AR_2 \geq 10$. In embodiments, a minimum thickness of a strip-like element, thus in embodiments the second dimension ($A_2$), may be 10 µm. This may in practice result in embodiments wherein for the second aspect ratio applies $AR_2 \leq 10,000$, especially $AR_2 \leq 10,000$, such as $AR_2 \leq 500$. In specific embodiments, the second aspect ratio ($AR_2$) may be selected from the range of $2 \leq AR_2 \leq 10,000$, such as $3 \leq AR_2 \leq 10,000$, especially $3 \leq AR_2 \leq 1,000$, more especially $4 \leq AR_2 \leq 1,000$. Such large second aspect ratios ($AR_2$) may especially be obtained with strip-like elements as core.

Alternatively, the core may comprise strip-like elements embedded in 3D printable core material. The 3D printable core material surrounding the strip-like elements may in embodiments be light transmissive, especially the 3D printable core material may be light transparent.

The strip-like elements have an element length ($L_E$). The element length ($L_E$) may be defined as length of the longest dimension of the strip-like element. In embodiments, the element length ($L_E$) may be the length of the strip-like element along the printing direction. The strip-like elements may be elongated, in embodiments $L_E \geq W$, like $L_E \geq 2*W$, such as $L_E \geq 5*W$, especially $L_E \geq 10*W$, more especially $L_E \geq 20*W$ wherein W is the layer width (W). Additionally or alternatively, in embodiments $L_E \geq 3*A_1$, especially $L_E > 5*A_1$, more especially $L_E \geq 8*A_1$, like $L_E \geq 10*A_1$, wherein $A_1$ is the first dimension ($A_1$) of the core cross-section, which is the longest dimension of the core-cross section. Additionally or alternatively, in embodiments $L_E \geq 5*A_2$, especially $L_E \geq 10*A_2$, more especially $L_E \geq 15*A_2$, like $L_E \geq 25*A_2$, wherein $A_2$ is the second dimension ($A_2$) of the core cross-section, which is the dimension perpendicular to the first dimension of the core-cross section ($A_1$). The element length ($L_E$) may be selected based on the design. A shorter element length ($L_E$) may be more convenient in a design having curves. In embodiments, the strip-like element may have an element length ($L_E$) of at least a sum of a length of all layers of the 3D item together. In this way, one strip-like element may be needed for the 3D item. Especially, the strip-like element may be flexible. A flexible strip-like element may enable printing curves.

Hence, in embodiments $A_1$ may especially be the width of the core and $A_2$ may be the height of the core; $L_E$ may be the length of the core (especially parallel to the layer).

In embodiments, the core may comprise a plurality of strip-like elements. These strip-like elements may be serially arranged in the core. For instance, this may be obtained by 3D printing wherein sequentially core-shell 3D printable material is printed wherein a strip-like element core is cut before leaving a printer nozzle. Alternatively, this may be obtained using a filament comprising a plurality of strip-like elements as core. A plurality of strip-like elements, especially having a spacing distance between adjacent strip-like elements may facilitate printing curves. Therefore, such filament comprising a plurality of strip-like elements may be suitable for the method of the invention, regardless of the shape of the 3D item. Printing curves will be discussed in more detail below. In embodiments, the method may comprise a plurality of N strip-like elements, wherein $N \geq 50$, especially $N \geq 80$, more especially $N \geq 100$. In embodiments, the spacing distance (S) between two neighboring strip-like elements $S \leq 10*L_E$, especially $S \leq 5*L_E$, more especially $S \leq 2*L_E$, such as $S \leq *L_E$.

Hence, in specific embodiments, the core comprises one or more strip-like elements, wherein each of the one or more strip-like elements have an element length ($L_E$) individually selected from the range of at least the layer width (W), wherein $L_E \geq 3*A_1$, wherein the spacing distance (S) between two neighboring strip-like elements $S \leq 10*L_E$, and wherein $2 \leq AR_2 \leq 10,000$.

Especially, the strip-like elements may comprise metal. In this way, a specular reflective core may be obtained. In embodiments, the core may comprise a specular reflective material. In specific embodiments, the core may comprise one or more of aluminum, silver, copper, etc. In embodiments, the strip-like elements may comprise a foil. In specific embodiments, the strip-like elements may comprise a metal foil (e.g. aluminum foil). As a foil may be very thin, large aspect ratios may be obtained using a foil as core material. For instance, the strip-like element may in embodiments have a thickness of 10-500 μm, such as at least 20 μm, like in the range of 20-200 μm. In embodiments, the core may comprise a flattened fiber.

In embodiments, the core material may comprise a thermosetting polymer. Especially, the core may comprise a strip-like element comprising a thermosetting polymer. Additionally or alternatively, the core material may comprise a thermoplastic polymer. Especially, the core may comprise a strip-like element comprising a thermoplastic polymer. In embodiments, the glass transition temperature $T_g$ of the core material may be higher than the glass transition temperature $T_g$ of the shell material. Yet further, in embodiments, the melting temperature $T_m$ of the core material may be higher than the melting temperature $T_m$ of the shell material. In embodiments, printing may be performed at a (nozzle) temperature above $T_g$ of the shell material, such as above $T_m$ of the shell material, but below the melting temperature $T_m$ of the core material. In this way, deformation of the core during printing may be limited or substantially prevented. Alternatively, 3D printing may be performed at a (nozzle) temperature above $T_g$ of the core material, or in specific embodiments above $T_m$ of the core material. In this way, the core (and shell) may be deformed during printing. The glass transition temperature and melting temperature will be described in more detail below.

In embodiments, the core may comprise support material that may be (partially) covered with particles. In embodiments, the core may comprise 3D printable material having particles embedded therein. In specific embodiments, the particles may be specular reflective. Embodiments wherein the core may comprise 3D printable material will be discussed in more detail below.

Hence, in specific embodiments, the core material comprises one or more of (i) a strip-like element comprising metal, (ii) a strip-like element comprising a foil, (iii) a strip-like element comprising a thermosetting polymer, (iv) a flexible strip-like element (v) a specular reflective material, and (vi) a support with reflective particles.

As indicated above, printing curves may be enabled by using a flexible strip-like element. Additionally or alternatively, shorter strip-like elements, such as $L_E \leq 3*W$, like $L_E \leq 2*W$, especially $L_E \leq W$ may be used for facilitating printing curves. Alternatively, the fused deposition modelling printer may cut an elongated strip-like element, facilitating making the curves. The strip-like element may be cut on one or more of (i) the beginning of the curve, (ii) in the curve, and (iii) the end of the curve. In embodiments, the element may be cut at a plurality of locations in the curve. In embodiments, the curve may comprise no core material. This may be achieved by cutting the strip-like element before the curve, continuing printing without the core during the curve and incorporating the core again after the curve. Therefore, in embodiments, during at least part of the 3D printing stage the 3D printing stage may comprise feeding an elongated strip-like element to a nozzle of a fused deposition modelling printer, wherein the fused deposition modelling 3D printer may further comprise a cutting device configured to control an element length ($L_E$) of the strip-like element(s).

Alternatively, strips with an elongated element length ($L_E$) may be rotated in order to make a curve, as is described in more detail below.

As indicated above, the method may in embodiments also provide variation in one or more of (i) decorative, and (ii) optical effects while the material composition may essentially be the same. In embodiments, the 3D printing stage may further comprise controlling optical properties of the 3D item by controlling a mutual angle ($\alpha_1$) between the first dimension ($A_1$) and the layer width (W). The mutual angle ($\alpha_1$) may be defined as the smallest angle between the first dimension ($A_1$) and the layer width (W). Hence, the mutual angle ($\alpha_1$) may be $0° \leq \alpha_1 \leq 90$. Especially, the 3D printing stage may comprise one or more of a first stage wherein $0° \leq \alpha_1 \leq 20°$, especially wherein $0° \leq \alpha_1 \leq 10°$. Especially, the 3D printing stage may comprise one or more of a second stage wherein $70° \leq \alpha_1 \leq 90°$, especially wherein $80° \leq \alpha_1 \leq 90°$. In specific embodiments, the 3D printing stage may comprise one or more of (i) a first stage and (ii) a second stage, wherein in the first stage $0° \leq \alpha_1 \leq 20°$, and wherein in the second stage $70° \leq \alpha_1 \leq 90°$.

In the first stage, the core may be substantially horizontal, whereas in the second stage the core may be substantially vertical. In a stack of layers, all being printed according to the first stage, the light (coming from a side) may be transmitted through the stack. In a stack of layers, all being printed according to the second stage, the cores of the layers together may essentially form a reflective surface. The light (coming from a side) may now be reflected by the stack.

The term "first stage" and "second stage" and similar phrases, may refer to any order of first and second stages. Further, during 3D printing there may be a plurality of changes between first and second stage, or second and first stage, etc. Stages may change within a layer. Additionally or alternatively, stages may change between layers. Changes between stages may provide the controllable optical properties, or even spatially different optical properties as mentioned above.

Note that the method may in embodiments comprise one or more first stages and one or more second stages. Especially, in embodiments the method may comprise a plurality of first stages and a plurality of second stages. In yet other embodiments, the method may in embodiments only comprise the first stage. In yet other embodiments, the method may in embodiments only comprise a single first stage and a single second stage.

Essentially, any mutual angle ($\alpha_1$) may be possible. In such embodiments, the mutual angle ($\alpha_1$) may be $0° \leq \alpha_1 \leq 90$. Therefore, the method may in embodiments comprise no first stage and no second stage. In such embodiments, the mutual angle ($\alpha_1$) may be $10° < \alpha_1 < 80°$, such as $10° < \alpha_1 < 70°$ or $20° < \alpha_1 < 80°$, like $20° < \alpha_1 < 70°$. These mutual angles ($\alpha_1$) are essentially all possible angles that are not included in the mutual angles ($\alpha_1$) of the first and second stage.

In embodiments, the method may comprise a plurality of different stages, each having a different mutual angle ($\alpha_1$). Additionally or alternatively, embodiments, the mutual angle ($\alpha_1$) may be changed during printing. Such changing of the mutual angle ($\alpha_1$) may be continuous. This may result in a twisted core in the layer and may provide sparkling effects to the 3D item. In other embodiments, changing of the mutual angle ($\alpha_1$) may be stepwise. Especially, the method may comprise any combination of mutual angle ($\alpha_1$). Additionally or alternatively, in embodiments part(s) of layer(s) may comprise no core. Thus, in these part(s), the item may essentially only comprise shell material.

By controlling the mutual angle ($\alpha_1$) of a core comprising an elongated shaped cross-section, it may be possible to create one or more 3D printed parts that have optical properties that may differ from one or more other parts, whereas the material composition may substantially, or even essentially, be the same (over all these parts). This may especially be achieved with a core comprising non-3D printable material.

Selecting the mutual angle ($\alpha_1$) may be based on the desired optical properties. Additionally or alternatively, the mutual angle ($\alpha_1$) may be selected based on a curvature of the design. Especially when the core material is more flexible along one axis compared to another axis, the mutual angle ($\alpha_1$) may be selected such that corners or bends may be enabled. For instance, when the layer is being printed in an x-y plane and an elongated metal strip-like element is being printed having mutual angle ($\alpha_1$) of 0°, a curve in the x-y plane may be difficult to achieve without disrupting the metal strip-like element. However, the metal strip-like element may be turned to having mutual angle ($\alpha_1$) of 90° such that the curve is enabled. After the curve, the metal strip-like element may be turned back to having mutual angle ($\alpha_1$) of 0°. Essentially, the direction of the highest flexibility of the strip-like element may be locally aligned with the direction of the curve. This approach may also be applicable to other mutual angles ($\alpha_1$) and other strip-like elements.

For controlling the mutual angle ($\alpha_1$), the method may in embodiments further comprise a rotating stage comprising rotating the core in a printer nozzle in a synchronized manner with controlling the mutual angle ($\alpha_1$). Additionally or alternatively, the method may in embodiments further comprise a rotating stage comprising rotating the filament in a printer nozzle in a synchronized manner with controlling the mutual angle ($\alpha_1$). In specific embodiments, the 3D printing stage and rotating stage may at least partly overlap in time.

Alternatively, the core material may in embodiments comprise 3D printable core material. In embodiments, the thermoplastic material of the core material may be light transmissive and may comprise particles (which may be dispersed in the thermoplastic material. The particles may be light reflective. Alternatively or additionally, the 3D printable core material, especially the thermoplastic material thereof, may be colored and/or the 3D printable material may comprise a colorant, such as a dye or pigment (which may be dispersed in the thermoplastic material (of the 3D printable core material)). Especially, in embodiments, the 3D printable core material may comprise specular light reflective particles, which may be specular reflective for the wavelength.

For obtaining a 3D item comprising a reflective surface, it may desirable that the reflective element, such as the core, may cross a majority of the layer. In this way, the majority of light may be reflected. Therefore, in embodiments, $0.5 \leq A_1/W \leq 1$, especially $0.6 \leq A_1/W \leq 1$, more especially $0.75 \leq A_1/W \leq 0.9$. Additionally or alternatively, $0.5 \leq A_1/H \leq 1$, especially $0.6 \leq A_1/H \leq 1$, more especially $0.75 \leq A_1/H \leq 0.9$. In the case of smaller values for first dimension ($A_1$), more light may be transmitted through the item.

Hence, in specific embodiments, the core material may comprise 3D printable core material comprising specular light reflective particles and wherein $0.5 \leq A_1/W \leq 1$.

As indicated above, in embodiments, the core material may comprise particles. Additionally or alternatively, the 3D printable shell material may comprise particles. The particles may each be individually described by a smallest rectangular prism circumscribing the respective particles. Such rectangular prism has a length $L_1$, a width $L_2$ and a height $L_3$, wherein $L_1 \geq L_2 \geq L_3$. In embodiments, the particles may be reflective, such as specular reflective, for one or more wavelengths. In embodiments, length $L_1$ is in the range from 1-1000 µm, especially in the range from 5-500 µm, more especially in the range from 10-300 µm. Especially, the particles may have a reflectivity R for the wavelength, wherein R>70%, especially R>80%, more especially R>85%. Hence, in embodiments the particles may e.g. be reflective flakes. Especially, such particles may render the 3D printable material or the 3D printed material a high reflectively. Therefore, the 3D printable material (and the 3D printed material) may comprise a light transmissive thermoplastic material, with reflective particles (embedded therein).

As indicated above, the 3D printable material alternatively or additionally may comprise additives that may be absorbing for one or more wavelengths. In embodiments, length $L_1$ is in the range from 1-100 µm, especially in the range from 5-80 µm, more especially in the range from 10-60 µm.

Alternatively or additionally, the 3D printable material (and 3D printed material) may comprise a dye, which may provide a color, or which may provide a white 3D printable material (and 3D printed material).

Combinations of two or more reflective particles, colored particles, and dyes may also be applied. In yet further specific embodiments (see also above), the 3D printable material (and 3D printed material) is light transmissive and does essentially not contain light reflective or light absorbing particles (or a dye).

Particle sizes may be determined with methods known in the art, like one or more of optical microscopy, SEM and TEM. Dimensions may be number averaged, as known in the art. Hence, the particles may be substantially identical, but the particles may also mutually differ, such as two or more subsets of particles, wherein within the subsets the particles are substantially identical. The particles may have a unimodal particle size distribution or a polymodal size distribution.

The particles may thus mutually differ. For instance, the particles may have a distribution of the sizes of one or more of the particle length, the particle height, and an intermediate length. Therefore, in embodiments in average, the particles will have dimensions as described herein. For instance, at least 50 wt % of the particles may comply with the herein indicated dimensions (including ratios), such as at least 75 wt %, like at least 85 wt %. In alternative embodiments, at least 50% of the total number of particles may comply with the herein indicated dimensions (including ratios), such as at least 75%, like at least 85%.

Using the method of the invention, the optical properties of the 3D item may be tuned in various ways. In embodiments, the 3D printing stage may further comprise: controlling optical properties of the 3D item by controlling a composition of the core material. Especially, the 3D printing stage may further comprise: controlling optical properties of the 3D item by controlling a composition of the 3D printable core material. Especially exposure of the optical properties of the core may be tuned using the method of the invention. In embodiments, the 3D printing stage may further comprise: controlling optical properties of the 3D item by controlling a composition of the 3D printable shell material. Especially light transmissive properties of the 3D printable shell material may determine whether optical properties of the core material may be exposed. In embodiments, the 3D printing stage may further comprise: controlling optical properties of the 3D item by controlling the second aspect ratio ($AR_2$). Larger second aspect ratios ($AR_2$) facilitate larger differences in optical properties of the 3D item by rotation of the core. Therefore, in embodiments, the 3D printing stage may further comprise: controlling optical properties of the 3D item by controlling the mutual angle ($\alpha_1$). Especially, the optical properties of the 3D item may depend on a combination of controlling all these properties. In embodiments, the 3D printing stage may further comprise: controlling optical properties of the 3D item by controlling one or more of (i) composition of the core material, (ii) composition of the 3D printable shell material, (iii) the second aspect ratio $AR_2$, and (iv) the mutual angle ($\alpha_1$). Hence, in specific embodiments, the 3D printing stage may further comprise: controlling optical properties of the 3D item by controlling one or more of (i) composition of the 3D printable core material, (ii) composition of the 3D printable shell material, (iii) the second aspect ratio $AR_2$, and (iv) the mutual angle ($\alpha_1$).

In embodiments, during part of the 3D printing stage, no core may be incorporated. Thus, essentially a layer or part of a layer may only comprise 3D printed shell material. In alternative embodiments, during part of the 3D printing stage, no shell may be incorporated. Thus, essentially a layer or part of a layer may only comprise core material.

As indicated above, the method comprises depositing during a printing stage 3D printable material. As described above, the shell comprises 3D printable shell material. In embodiments, the core material may comprise 3D printable material. Here, some embodiments on 3D printable material as such will be described. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed. The term "extrudate" may be used to define the 3D printable material downstream of the printer head, but not yet deposited. The latter is indicated as "3D printed material". In fact, the extrudate comprises 3D printable material, as the material is not yet deposited. Upon deposition of the 3D printable material or extrudate, the material is thus indicated as 3D printed material. Essentially, the materials are the same material, as the thermoplastic material upstream of the printer head, downstream of the printer head, and when deposited, is essentially the same material.

Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature. In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former. The glass temperature may e.g. be determined with differential scanning calorimetry. The melting point or melting temperature can also be determined with differential scanning calorimetry.

As indicated above, the invention thus provides a method comprising providing a filament of 3D printable material and printing during a printing stage said 3D printable material on a substrate, to provide said 3D item.

As indicated above, the invention thus provides a method comprising providing a filament of 3D printable material and printing during a printing stage said 3D printable material on a substrate, to provide said 3D item.

Hence, in another aspect the invention provides a filament for producing a 3D item by means of fused deposition modelling. Especially, the filament may comprise (i) a core comprising a core material, and (ii) a shell comprising a printable shell material. In embodiments, the core material may be one or more of (i) reflective, (ii) transmissive, (iii) absorbing, and (iv) luminescent for light having a wavelength in the visible wavelength range. In embodiments, the core material may be light reflective for the wavelength in the visible wavelength range. Especially, the core material may be specular reflective for the wavelength in the visible wavelength range. In embodiments, the core material may be light transmissive for the wavelength in the visible wavelength range. Additionally or alternatively, the core material may be light absorbing for the wavelength in the visible wavelength range. In embodiments, the core material may be luminescent for light having a wavelength in the visible wavelength range. In embodiments, the 3D printable shell material may be transmissive for the wavelength in the visible wavelength range. Especially, the 3D printable shell material may be transparent for the wavelength in the visible wavelength range. The filament has a filament width ($W_F$) and a filament height ($H_F$) and a first filament aspect ratio $AR_{1F}$, wherein $AR_{1F}=W_F/H_F$. In embodiments, $AR_{1F}\geq 1$, especially $AR_{1F}\geq 1$, like at least 1.2. A filament cross-sectional plane of the filament, comprising the filament width ($W_F$) and the filament height ($H_F$), and the core, provides a filament core cross section, comprising a first filament core dimension ($A_{1F}$), which is the longest dimension, and a second filament core dimension ($A_{2F}$), perpendicular to the first filament core dimension ($A_{1F}$), providing a second filament aspect ratio $AR_{2F}$. In embodiments, $2\leq AR_{2F}\leq 10,000$. In specific embodiments, $AR_{2F}/AR_{1F}>1$, especially, $AR_{2F}/AR_{1F}\geq 1.5$, more especially $AR_{2F}/AR_{1F}\geq 2$.

Hence, in specific embodiments, the invention provides a filament for producing a 3D item by means of fused deposition modelling, the filament comprising: (i) a core comprising a core material, and (ii) a shell comprising a printable shell material, wherein (a) the core material is one or more of (i) reflective, (ii) transmissive, (iii) absorbing, and (iv) luminescent for light having for a wavelength in the visible wavelength range; (b) the 3D printable shell material is light transmissive for the wavelength in the visible wavelength range; (c) the filament has a filament width ($W_F$) and a filament height ($H_F$) and a first filament aspect ratio $AR_{1F}$, wherein $AR_{1F}=W_F/H_F$, wherein $AR_{1F}>1$; (d) a filament cross-sectional plane of the filament, wherein the filament cross-sectional plane comprises the filament width ($W_F$) and the filament height ($H_F$), and the core, provide a filament core cross section, wherein the filament core cross-section has a first filament core dimension ($A_{1F}$), which is the longest dimension, and a second filament core dimension ($A_{2F}$), perpendicular to the first filament core dimension ($A_{1F}$), providing a second filament aspect ratio $AR_{2F}$, wherein $AR_{2F}=A_{1F}/A_{2F}$, wherein $2\leq AR_{2F}\leq 10,000$; and (e) $AR_{2F}/AR_{1F}\geq 1.5$.

In this way, it may be possible to prepare 3D printed items with controlled optical properties whilst starting from a previously prepared filament.

The embodiments described above in relation to the method of the present invention, may also apply for the filament of the invention.

In specific embodiments, the cross-section of the core has an elongated shape. In this way, controlling the orientation of the core relative to the layer may provide control over optical properties of the layer. Therefore, in embodiments $AR_{2F}\geq 2$, like $AR_{2F}\geq 3$, especially $AR_{2F}\geq 4$, more especially $AR_{2F}\geq 5$. In embodiments, the minimum thickness of a strip-like element, thus the second filament dimension ($A_{2F}$) may by 10 μm. This may in practice result in embodiments wherein second aspect ratio $AR_{2F}\leq 10,000$, especially $AR_{2F}\leq 10,00$, such as $AR_{2F}\leq 500$.

In embodiments, the aspect ratio of the filament core cross-section (second aspect ratio $AR_{2F}$) may be larger than the aspect ratio of the filament cross-section (first aspect ratio $AR_{1F}$). In embodiments $1\leq AR_{1F}\leq 3$. In specific embodiments, $2\leq AR_{2F}\leq 10,000$, such as $3\leq AR_{2F}\leq 10,000$, especially $3\leq AR_{2F}\leq 1,000$, more especially $4\leq AR_{2F}\leq 1,000$.

For obtaining a 3D item comprising a reflective surface, it may desirable that the reflective element, such as the core, may cross a majority of the layer. Therefore, in embodiments, $0.8\leq A_{1F}/W_F\leq 1$, especially $0.9\leq A_{1F}/W_F\leq 1$, more especially $0.95\leq A_{1F}/W_F\leq 1$.

Additionally or alternatively, $0.8\leq A_{1F}/H_F\leq 1$, especially $0.9\leq A_{1F}/H_F\leq 1$, more especially $0.95\leq A_{1F}/H_F\leq 1$.

As described in more detail above, the core may comprise non-3D printable material. In embodiments, it may be desirable that the core may comprise strip-like elements. Especially, the core may comprise serially arranged strip-like elements. In embodiments, the strip-like elements may be flexible. The strip-like elements each have an element length ($L_E$) which may individually be selected from the range of at least the layer width (W). In embodiments, the strip-like element may comprise a metal strip-like element. Hence, in specific embodiments, the filament comprises a core that may comprise serially arranged strip-like elements each having an element length ($L_E$) individually selected from the range of at least the layer width (W), wherein the strip-like element comprises a metal strip-like element.

Materials that may especially qualify as 3D printable materials may be selected from the group consisting of metals, glasses, thermoplastic polymers, silicones, etc. . . . Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polycarbonate (PC), Polystyrene (PS), PE (such as expanded-high impact-Polythene (or polyethene), Low density (LDPE) High density (HDPE)), PVC (polyvinyl chloride) Polychloroethene, such as thermoplastic elastomer based on copolyester elastomers, polyurethane elastomers, polyamide elastomers polyolefine based elastomers, styrene based elastomers, etc. . . . . . Optionally, the 3D printable material comprises a 3D printable material selected from the group consisting of Urea formaldehyde, Polyester resin, Epoxy resin, Melamine formaldehyde, thermoplastic elastomer, etc. . . . . Optionally, the 3D printable material comprises a 3D printable material selected from the group consisting of a polysulfone. Elastomers, especially thermoplastic elastomers, are especially interesting as they are flexible and may help obtaining relatively more flexible filaments comprising the thermally conductive material. A thermoplastic elastomer may comprise one or more of styrenic block copolymers (TPS (TPE-s)), thermoplastic polyolefin elastomers (TPO (TPE-o)), thermoplastic vulcanizates (TPV (TPE-v or TPV)), thermoplastic polyurethanes (TPU (TPU)), thermoplastic copolyesters (TPC (TPE-E)), and thermoplastic polyamides (TPA (TPE-A)).

Suitable thermoplastic materials, such as also mentioned in WO2017/040893, may include one or more of polyacetals (e.g., polyoxyethylene and polyoxymethylene), poly($C_{1-6}$ alkyl)acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polycarbonates, polyethylene terephthalates, polyethylene naphtholates, polybutylene terephthalates, polyarylates), and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl)methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers. Embodiments of polyamides may include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl)acrylates and poly($C_{1-6}$ alkyl)methacrylates, which include, for instance, polymers of methyl acrylate, ethyl acrylate, acrylamide, methacrylic acid, methyl methacrylate, n-butyl acrylate, and ethyl acrylate, etc. . . . . In embodiments, a polyolefine may include one or more of polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene.

In specific embodiments, the 3D printable material (and the 3D printed material) comprise one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and semi-crystalline polyethylene terephthalate (PET), acrylonitrile butadiene styrene (ABS), poly(methyl methacrylate) (PMMA), polystyrene (PS), and styrene acrylic copolymers (SMMA).

The term 3D printable material is further also elucidated below, but especially refers to a thermoplastic material, optionally including additives, to a volume percentage of at maximum about 60%, especially at maximum about 30 vol. %, such as at maximum 20 vol. % (of the additives relative to the total volume of the thermoplastic material and additives).

The printable material may thus in embodiments comprise two phases. The printable material may comprise a phase of printable polymeric material, especially thermoplastic material (see also below), which phase is especially an essentially continuous phase. In this continuous phase of thermoplastic material polymer additives such as one or more of antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent may be present. The additive may have useful properties selected from optical properties, electrical properties, thermal properties, and mechanical properties (see also above).

The printable material in embodiments may comprise particulate material, i.e. particles embedded in the printable polymeric material, which particles form a substantially discontinuous phase. The number of particles in the total mixture is especially not larger than 60 vol. %, relative to the total volume of the printable material (including the (anisotropically conductive) particles) especially in applications for reducing thermal expansion coefficient. For optical and surface related effect number of particles in the total mixture is equal to or less than 20 vol. %, such as up to 10 vol. %, relative to the total volume of the printable material (including the particles). Hence, the 3D printable material especially refers to a continuous phase of essentially thermoplastic material, wherein other materials, such as particles, may be embedded. Likewise, the 3D printed material especially refers to a continuous phase of essentially thermoplastic material, wherein other materials, such as particles, are embedded. The particles may comprise one or more additives as defined above. Hence, in embodiments the 3D printable materials may comprises particulate additives.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. . . . . Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. . . . . Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc. . . . , or a separate substrate thereon or comprised thereby.

Layer by layer printable material is deposited, by which the 3D printed item is generated (during the printing stage). The 3D printed item may show a characteristic ribbed structure (originating from the deposited filaments). However, it may also be possible that after a printing stage, a further stage is executed, such as a finalization stage. This stage may include removing the printed item from the receiver item and/or one or more post processing actions. One or more post processing actions may be executed before removing the printed item from the receiver item and/or one more post processing actions may be executed after removing the printed item from the receiver item. Post processing may include e.g. one or more of polishing, coating, adding a functional component, cross-linking, etc. . . . . Post-processing may include smoothening the ribbed structures, which may lead to an essentially smooth surface. Post-processing may include cross-linking of the thermoplastic material. This may result in fewer or no thermoplastic properties of the material.

Further, the invention relates to a software product that can be used to execute the method described herein. Therefore, in yet a further aspect the invention also provides a computer program product, when running on a computer which is functionally coupled to or comprised by a fused deposition modeling 3D printer, is capable of bringing about the method as described herein.

Hence, in an aspect the invention (thus) provides a software product, which, when running on a computer is capable of bringing about (one or more embodiments of) the method (for producing a 3D item by means of fused deposition modelling) as described herein.

The herein described method provides 3D printed items. Hence, the invention also provides in a further aspect a 3D printed item obtainable with the herein described method. In a further aspect a 3D printed item obtainable with the herein described method is provided.

Especially, the invention provides a 3D item comprising 3D printed material, wherein the 3D item comprises a plurality of layers of 3D printed material, wherein: (a) at least part of one of the layers may comprise a core-shell layer of 3D printed material, wherein the core-shell layer comprises (i) a core comprising a core material, and (ii) a shell comprising a 3D printed shell material. In embodiments, the shell at least partly encloses the core.

As described in more detail above, in embodiments, the core material (of a at least part of a layer of a 3D printed item) is one or more of (i) reflective, (ii) transmissive, (iii) absorbing, and (iv) luminescent for light having a wavelength in the visible wavelength range. In embodiments, the core material may be light reflective for the wavelength in the visible wavelength range. Especially, the core material may be specular reflective for the wavelength in the visible wavelength range. In embodiments, the core material may be light transmissive for the wavelength in the visible wavelength range. Additionally or alternatively, the core material may be light absorbing for the wavelength in the visible wavelength range. In embodiments, the core material may be luminescent for light having a wavelength in the visible wavelength range. In embodiments, the 3D printable shell material may be transmissive for the wavelength in the visible wavelength range. Especially, the 3D printable shell material may be transparent for the wavelength in the visible wavelength range. In this way, the optical properties of the core may be exposed. As described above in relation to the method of the invention, the core-shell layer has a layer width (W) and a layer height (H) and a first aspect ratio $AR_1$, wherein $AR_1=W/H$. In embodiments $AR_1 \geq 1$, such as $AR_1 \geq 1$, like at least 1.2. A cross-sectional plane of the core-shell layer, wherein the cross-sectional plane comprises the layer width (W) and the layer height (H), and the core provide a core cross-section, wherein the core cross-section has a first dimension ($A_1$), which is the longest dimension of the core cross-section, and a second dimension ($A_2$), perpendicular to the first dimension ($A_1$). Especially, the second dimension $A_2$ is the longest dimension perpendicular to the first dimension. For instance, in the case of an ellipse, the first dimension would be defined by the semi-major axes, and the second dimension by the semi-minor axes. Or for instance, in the case of a scalene triangle, the longest side would be the first dimension, and the distance from that side to the opposite angle would be the second dimension (measured along a perpendicular to the longest side. The first dimension ($A_1$) and the second dimension ($A_2$) provide a second aspect ratio $AR_2$, wherein $AR_2=A_1/A_2$. In embodiments, $2 \leq AR_2 \leq 10,000$. In specific embodiments, $AR_2/AR_1 \geq 1.2$, especially, $AR_2/AR_1 \geq 1.5$, more especially $AR_2/AR_1 \geq 2$.

Hence, in specific embodiments the invention provides a 3D item comprising 3D printed material, wherein the 3D item comprises a plurality of layers of 3D printed material, wherein: (a) at least one of the layers comprises a core-shell layer of 3D printed material; wherein the core-shell layer comprises (i) a core comprising a core material, and (ii) a shell comprising a 3D printed shell material; wherein the shell at least partly encloses the core; (b) the core material is one or more of (i) reflective, (ii) transmissive, (iii) absorbing, and (iv) luminescent for light having a wavelength in the visible wavelength range; (c) the 3D printed shell material is light transmissive for the wavelength in the visible wavelength range; (d) the core-shell layer has a layer width (W) and a layer height (H) and a first aspect ratio $AR_1$, wherein $AR_1=W/H$, wherein $AR_1>1$; (e) a cross-sectional plane of the core-shell layer, wherein the cross-sectional plane comprises the layer width (W) and the layer height (H), and the core provide a core cross-section, wherein the core cross-section has a first dimension ($A_1$), which is the longest dimension of the core cross-section, and a second dimension ($A_2$), perpendicular to the first dimension ($A_1$), providing a second aspect ratio $AR_2$, wherein $AR_2=A_1/A_2$, wherein in specific embodiments $2 \leq AR_2 \leq 10,000$; and (f) wherein in specific embodiments $AR_2/AR_1 \geq 1.5$.

In such a 3D item, optical properties may vary locally while the material composition remains essentially the same.

The 3D printed item may comprise a plurality of layers on top of each other, i.e. stacked layers. The width (thickness) and height of (individually 3D printed) layers may e.g. in embodiments be selected from the range of 100-5000 µm, such as 200-2500 µm, with the height in general being smaller than the width. For instance, the ratio of height and width may be equal to or smaller than 0.8, such as equal to or smaller than 0.6.

Layers may be core-shell layers or may consist of a single material. Within a layer, there may also be a change in composition, for instance when a core-shell printing process was applied and during the printing process it was changed from printing a first material (and not printing a second material) to printing a second material (and not printing the first material).

At least part of the 3D printed item may include a coating.

Some specific embodiments in relation to the 3D printed item have already been elucidated above when discussing the method. Below, some specific embodiments in relation to the 3D printed item are discussed in more detail.

As described above in more detail in relation to the method of the invention, in at least part of the 3D item (1) the core may comprise strip-like elements each having an element length ($L_E$) of at least the layer width (W). Especially, the strip-like elements may be serially arranged. In embodiments, the strip-like elements may be flexible.

As indicated above, in embodiments, in at least part of the 3D item $2 \leq AR_2 \leq 10,000$, such as $3 \leq AR_2 \leq 10,000$, especially $3 \leq AR_2 \leq 1,000$, more especially $4 \leq AR_2 \leq 1,000$ applies. Additionally or alternatively, in at least part of the 3D item $0.5 \leq A_1/W \leq 1$, especially $0.6 \leq A_1/W \leq 1$, more especially $0.75 \leq A_1/W \leq 0.9$ may apply.

Hence, in specific embodiments, in at least part of the 3D item the core comprises strip-like elements each having an element length ($L_E$) of at least the layer width (W), and wherein in at least part of the 3D item $2 \leq AR_2 \leq 10,000$ applies.

In embodiments, in at least part of the 3D item the core material may comprises one or more of a strip-like element comprising a foil, (iii) a strip-like element comprising a thermosetting polymer, (iv) a flexible strip-like element (v) a specular reflective material, and (vi) a support with reflective particles. In specific embodiments, $L_E>2*W$. Especially, the thermosetting polymer is cured before 3D printing. However, due to its dimensions, such as the aspect ratio $AR_2$, the core material may be relatively flexible.

In embodiments, the 3D printed item may comprise one or more of (i) a first part and (ii) a second part, wherein in the first part $0°≤α_1≤20°$, especially wherein $0°≤α_1≤10°$, and wherein in the second part $80°≤α_1≤100°$, especially wherein $85°≤α_1≤95°$. In yet other embodiments, the method may comprise no first parts and no second parts. In such embodiments, the mutual angle ($α_1$) may be $10°≤α_1≤85°$, such as $10°≤α_1≤80°$ or $20°≤α_1≤85°$, like $20°≤α_1≤80°$.

In embodiments, one or more of the cores of the core-shell layers may be aligned such that the 3D item may comprise a light reflective surface.

The (with the herein described method) obtained 3D printed item may be functional per se. For instance, the 3D printed item may be a lens, a collimator, a reflector, etc. . . . . The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light transmissive element, an optical filter, etc. . . . . The term optical component may also refer to a light source (like a LED). The term "electrical component" may e.g. refer to an integrated circuit, PCB, a battery, a driver, but also a light source (as a light source may be considered an optical component and an electrical component), etc. . . . . The term magnetic component may e.g. refer to a magnetic connector, a coil, etc. . . . . Alternatively, or additionally, the functional component may comprise a thermal component (e.g. configured to cool or to heat an electrical component). Hence, the functional component may be configured to generate heat or to scavenge heat, etc.

As indicated above, the 3D printed item maybe used for different purposes. Amongst others, the 3D printed item may be used in lighting. Hence, in yet a further aspect the invention also provides a lighting device comprising the 3D item as defined herein. In a specific aspect the invention provides a lighting system comprising (a) a light source configured to provide (visible) light source light and (b) the 3D item as defined herein, wherein 3D item may be configured as one or more of (i) at least part of a housing, (ii) at least part of a wall of a lighting chamber, and (iii) a functional component, wherein the functional component may be selected from the group consisting of an optical component, a support, an electrically insulating component, an electrically conductive component, a thermally insulating component, and a thermally conductive component. Hence, in specific embodiments the 3D item may be configured as one or more of (i) at least part of a lighting device housing, (ii) at least part of a wall of a lighting chamber, and (iii) an optical element. As a relative smooth surface may be provided, the 3D printed item may be used as mirror or lens, etc. . . . . In embodiments, the 3D item may be configured as shade. A device or system may comprise a plurality of different 3D printed items, having different functionalities.

Returning to the 3D printing process, a specific 3D printer may be used to provide the 3D printed item described herein. Therefore, in yet a further aspect the invention also provides a fused deposition modeling 3D printer, comprising (a) a printer head comprising a printer nozzle, and (b) a 3D printable material providing device configured to provide 3D printable material to the printer head, wherein the fused deposition modeling 3D printer is configured to provide said 3D printable material as indicated above.

The printer nozzle may include a single opening. In other embodiments, the printer nozzle may be of the core-shell type, having two (or more) openings. The term "printer head" may also refer to a plurality of (different) printer heads; hence, the term "printer nozzle" may also refer to a plurality of (different) printer nozzles.

It may be useful to use a standard FDM printer (with a core-shell nozzle). In embodiments, the printer nozzle may comprise a core-shell printer nozzle comprising a core nozzle part and a shell nozzle part. Especially, the method may comprise feeding the strip-like element(s) via the core nozzle part and feeding the 3D printable material via the shell nozzle part. The dimensions of the core nozzle may allow the strip-like elements to be extruded. In embodiments, the core nozzle may have a larger aspect ratio than the shell nozzle.

In embodiments, the fused deposition modeling 3D printer may comprise a printer head, wherein the printer head may comprise the printer nozzle. Especially, the printer head may comprise a first material entrance for the 3D printable material and a second material entrance for the strip-like elements, wherein the first material entrance, the second material entrance are in fluid contact with the printer nozzle. Such second material entrance may also be a side entrance; the first material entrance may be a top entrance.

In embodiments, the method may comprise applying a glidant to the first shell of the strip-like elements for guiding the strip-like elements to the center of the layer. This glidant is optional. The glidant may e.g. comprise a fatty substance which may in embodiments melt or may in other embodiments not melt at the temperature of the nozzle during printing.

In embodiments, the method may comprise using a filament comprising the core-shell material, and wherein the method comprises layer-wise depositing the filament via the printer nozzle to provide the core-shell-layer.

The 3D printable material providing device may provide a filament comprising 3D printable material to the printer head or may provide the 3D printable material as such, with the printer head creating the filament comprising 3D printable material. Hence, in embodiments the invention provides a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to a substrate, as indicated above.

Especially, the 3D printer may comprise a controller (or is functionally coupled to a controller) that is configured to execute in a controlling mode (or "operation mode") the method as described herein. Instead of the term "controller" also the term "control system" (see e.g. above) may be applied.

The term "controlling", and similar terms especially refer at least to determining the behavior or supervising the running of an element. Hence, herein "controlling" and similar terms may e.g. refer to imposing behavior to the element (determining the behavior or supervising the running of an element), etc. . . . , such as e.g. measuring, displaying, actuating, opening, shifting, changing temperature, etc. . . . . Beyond that, the term "controlling", and similar terms may additionally include monitoring. Hence, the term "controlling", and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
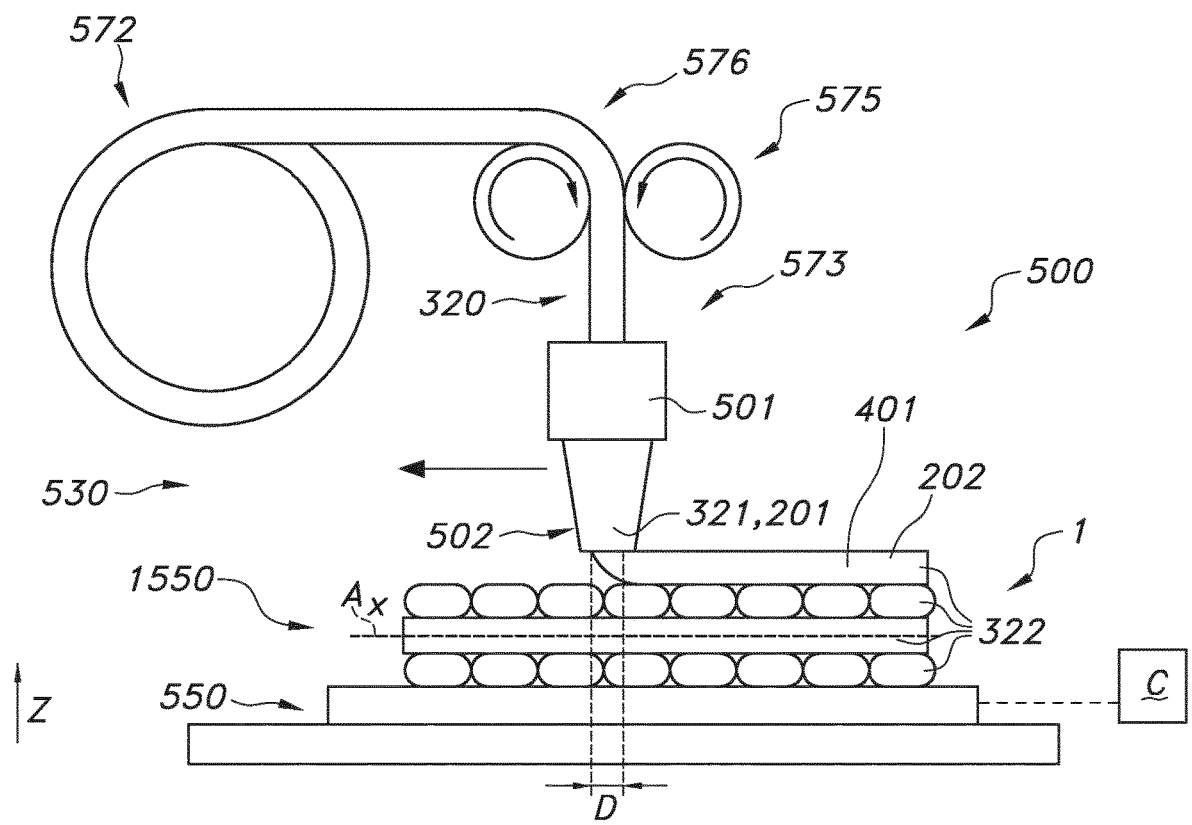
FIGS. 1a-1c schematically depict some general aspects of the 3D printer and of an embodiment of 3D printed material.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as an FDM 3D printer head is schematically depicted. Reference 501 indicates the printer head. Reference 502 indicates a printer nozzle. Reference 320 indicates a filament of printable 3D printable material (such as indicated above).

During at least part of the 3D printing stage the 3D printable material 201 may comprise core material 331 and 3D printable shell material 1361. The core material 331 may be one or more of (i) reflective, (ii) transmissive, (iii) absorbing, and (iv) luminescent for light 21 having a wavelength in the visible wavelength range. In embodiments, the 3D printable shell material 1361 may transmissive for the wavelength in the visible wavelength range. In embodiments, light 21 may especially refer to visible light, more especially to day light or white artificial light.

For the sake of clarity, not all features of the 3D printer have been depicted, only those that are of especial relevance for the present invention (see further also below). Reference 321 indicates extrudate (of 3D printable material 201).

The 3D printer 500 is configured to generate a 3D item 1 by layer-wise depositing on a receiver item 550, which may in embodiments at least temporarily be cooled, a plurality of layers 322 wherein each layer 322 comprises 3D printable material 201, such as having a melting point $T_m$. The 3D printable material 201 may be deposited on a substrate 1550 (during the printing stage). By deposition, the 3D printable material 201 has become 3D printed material 202. 3D printable material 201 escaping from the nozzle 502 is also indicated as extrudate 321. Reference 401 indicates thermoplastic material.

The 3D printer 500 may be configured to heat the filament 320 material upstream of the printer nozzle 502. This may e.g. be done with a device comprising one or more of an extrusion and/or heating function. Such device is indicated with reference 573 and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as 3D printed material, which is indicated with reference 202.

Reference 572 indicates a spool or roller with material, especially in the form of a wire, which may be indicated as filament 320. The 3D printer 500 transforms this in an extrudate 321 downstream of the printer nozzle which becomes a layer 322 on the receiver item or on already deposited printed material. In general, the diameter of the extrudate 321 downstream of the nozzle 502 is reduced relative to the diameter of the filament 322 upstream of the printer head 501. Hence, the printer nozzle is sometimes (also) indicated as extruder nozzle. Arranging layer 322 by layer 322, a 3D item 1 may be formed. Reference 575 indicates the filament providing device, which here amongst others include the spool or roller and the driver wheels, indicated with reference 576.

Reference Ax indicates a longitudinal axis or filament axis.

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Alternatively or additionally, in embodiments the receiver plate may also be moveable in one or two directions in the x-y plane (horizontal plane). Further, alternatively or additionally, in embodiments the receiver plate may also be rotatable about z axis (vertical). Hence, the control system may move the receiver plate in one or more of the x-direction, y-direction, and z-direction.

Alternatively, the printer can have a head can also rotate during printing. Such a printer has an advantage that the printed material cannot rotate during printing.

Layers are indicated with reference 322, and have a layer height H and a layer width W. A cross-sectional plane of the layer 322 perpendicular to the printing direction comprises the layer width W and the layer height H. Wherein the longest dimension of the layer cross-section may be defined as the layer width W and a dimension perpendicular to the layer width W may be defined as the layer height H.

Note that the 3D printable material is not necessarily provided as filament 320 to the printer head. Further, the filament 320 may also be produced in the 3D printer 500 from pieces of 3D printable material.

Reference D indicates the diameter of the nozzle (through which the 3D printable material 201 is forced).

Figure 1B:
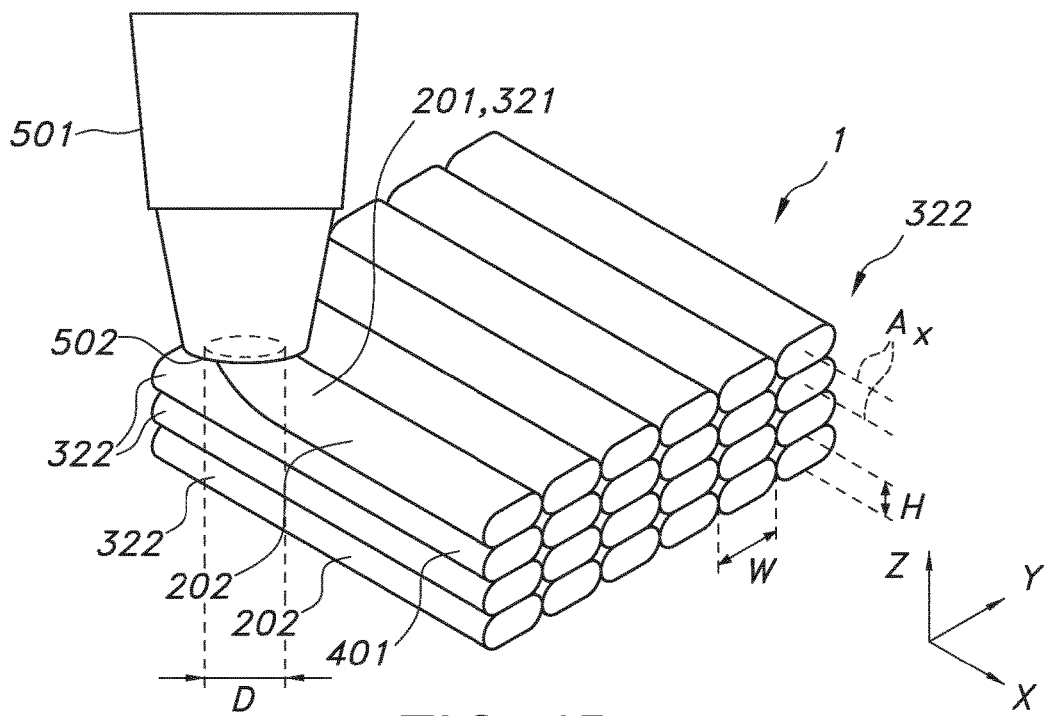

FIG. 1b schematically depicts in 3D in more detail the printing of the 3D item 1 under construction. Here, in this schematic drawing the ends of the filaments 321 in a single plane are not interconnected, though in reality this may in embodiments be the case. Reference H indicates the height of a layer. Layers are indicated with reference 322. Here, the layers have an essentially circular cross-section. Often, however, they may be flattened, such as having an outer shape resembling a flat oval tube or flat oval duct (i.e. a circular shaped bar having a diameter that is compressed to have a smaller height than width, wherein the sides (defining the width) are (still) rounded).

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 321 comprising 3D printable material 201 to the first printer head 501, and optionally (c) a receiver item 550. In FIGS. 1a-1b, the printable material or the printed material are indicated with the general indications printable material 201 and printed material 202, respectively. Directly downstream of the nozzle 502, the filament 321 with 3D printable material becomes, when deposited, layer 322 with 3D printed material 202.

Figure 1C:
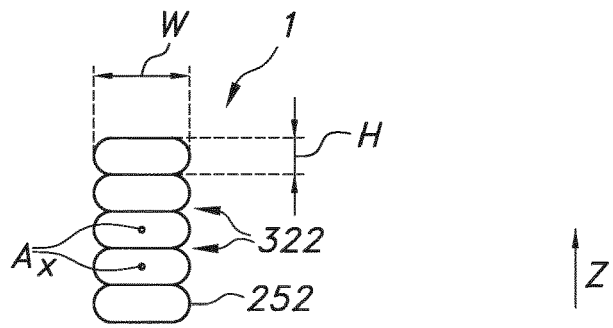

FIG. 1c schematically depicts a stack of 3D printed layers 322, each having a layer height H and a layer width W. Note that in embodiments the layer width and/or layer height may differ for two or more layers 322. Reference 252 in FIG. 1c indicates the item surface of the 3D item (schematically depicted in FIG. 1c).

Referring to FIGS. 1a-1c, the filament of 3D printable material that is deposited leads to a layer having a height H (and width W). Depositing layer 322 after layer 322, the 3D item 1 is generated. FIG. 1c very schematically depicts a single-walled 3D item 1.

Figure 2A:
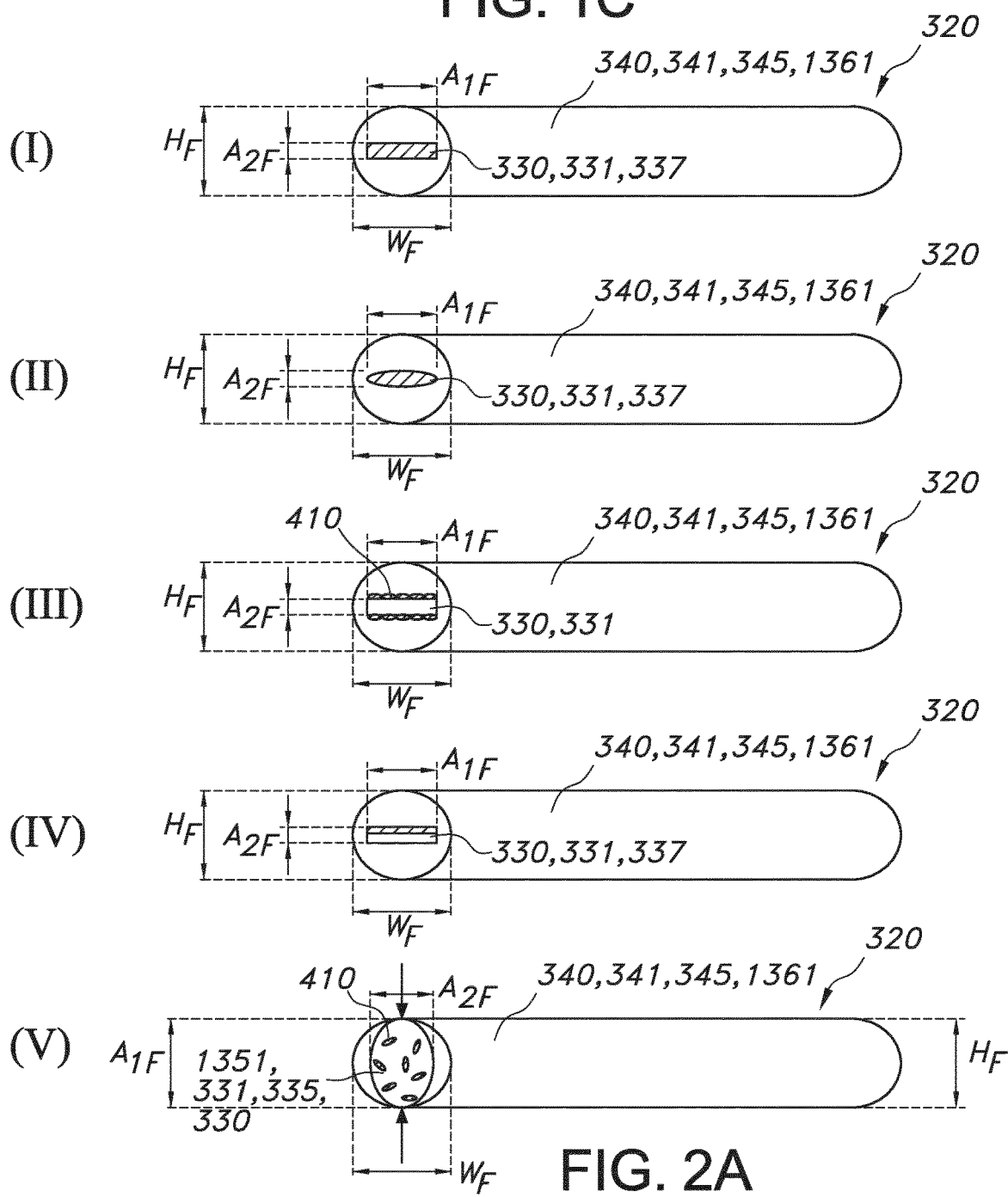
FIGS. 2a-2d schematically depict some further aspects of the filament, method and of the 3D printed material of the invention.

FIG. 2a schematically depicts some embodiments of a (core-shell) filament 320 that may be used in the method. The filaments 320 may be used in a printer 500, e.g. as depicted in FIG. 1a-1b, having a nozzle 502 with a single opening. The geometry, especially the first dimension $A_{1F}$ of the core, second dimension of the core $A_{2F}$ and the width $W_F$ and height $H_F$ in the filaments are indicated. The filament 320 has a filament width $W_F$ and a filament height $H_F$ and a first filament aspect ratio $AR_{1F}$, wherein $AR_{1F}=W_F/H_F$. In embodiments, such filament 320 for producing a 3D item 1 by means of fused deposition modelling may comprise: (i) a core 330 comprising a core material 331, and (ii) a shell 340 comprising a printable shell material 1361. FIG. 2a schematically depicts some embodiments of filaments. In embodiments, the core material 331 may comprise non-3D printable core material. (I, II) The core 330 may comprise one or more strip-like elements 337. The cross-section of such strip-like elements 337 may have any shape such as rectangular, oval, irregular, etc. (III) The core 330 may comprise a support, e.g. 3D printable material 1351, that may be (partially) covered with particles 410. Alternatively, the core may comprise a strip-like element that may be (partially) covered with particles 410. In specific embodiments, the core may comprise a support with reflective particles 410. (IV) The core 330 may have a coating on one or more of the surfaces. In this way, the optical properties may vary depending on the surface of the core 330. (V) The core 330 may comprise 3D printable material 1351 having particles 410 embedded therein. In embodiments, the core material 331 is one or more of (i) reflective, (ii) transmissive, (iii) absorbing, and (iv) luminescent for light having a wavelength in the visible wavelength range.

In embodiments, the 3D printable shell material 1361 may be light 21 transmissive for the wavelength in the visible wavelength range, especially, the 3D printable shell material 1361 may be light 21 transparent for the wavelength in the visible wavelength range.

Figure 2B:
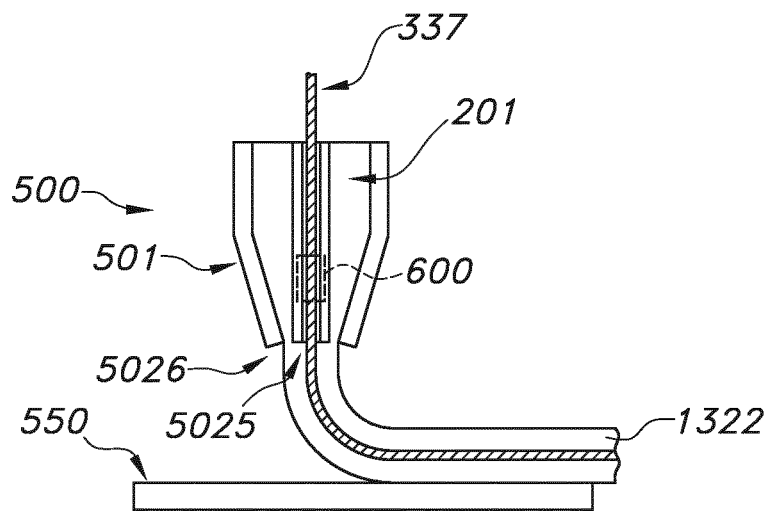

FIG. 2b schematically depicts a fused deposition modeling 3D printer 500 comprising a core-shell nozzle comprising a core nozzle 5025 and a shell nozzle 5026. In the depicted embodiment, the 3D printing stage comprises feeding an elongated strip-like element 337 to a nozzle of a fused deposition modelling printer 500. The strip-like element may be introduced via the core nozzle 5025. The depicted fused deposition modelling 3D printer 500 further comprises a cutting device 600 configured to control a length $L_E$ of the strip-like element(s) 337. Such fused deposition modelling 3D printer 500 may further control spacing distance S between strip-like elements 337.

Figure 2C:
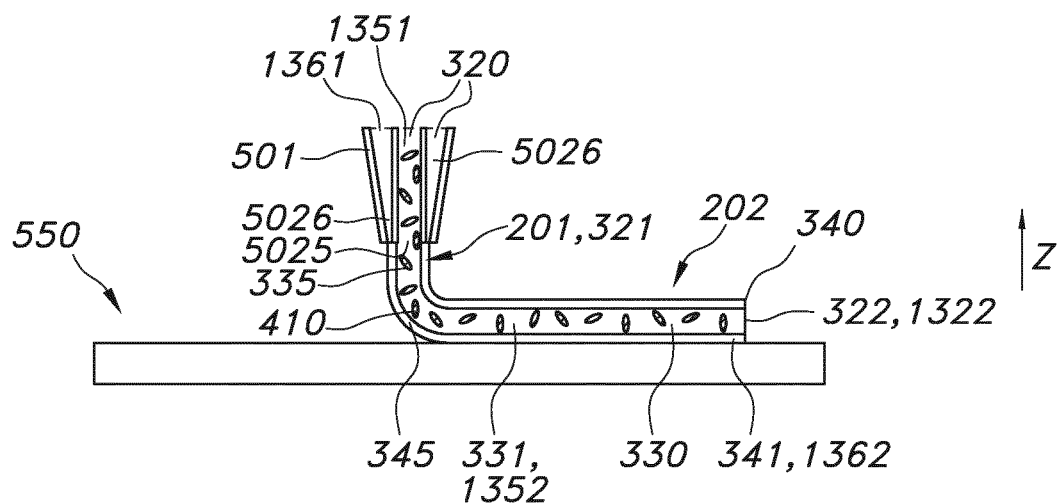

FIG. 2c schematically depicts a fused deposition modeling 3D printer 500 comprising a core-shell nozzle comprising a core nozzle 5025 and a shell nozzle 5026. Such core-shell nozzle may be used in the invention in embodiments wherein the core material 331 comprises 3D printable core material 1351. Especially, the 3D printable core material 1351 may comprise particles 410. The particles 410 may in embodiments be specular reflective particles 410. In embodiments, 3D printing stage may further comprise: controlling optical properties of the 3D item 1 by controlling one or more of (i) composition of the (3D printable) core material 1351, (ii) composition of the 3D printable shell material 1361, (iii) the second aspect ratio $AR_2$, and (iv) the mutual angle $(\alpha_1)$.

Figure 2D:
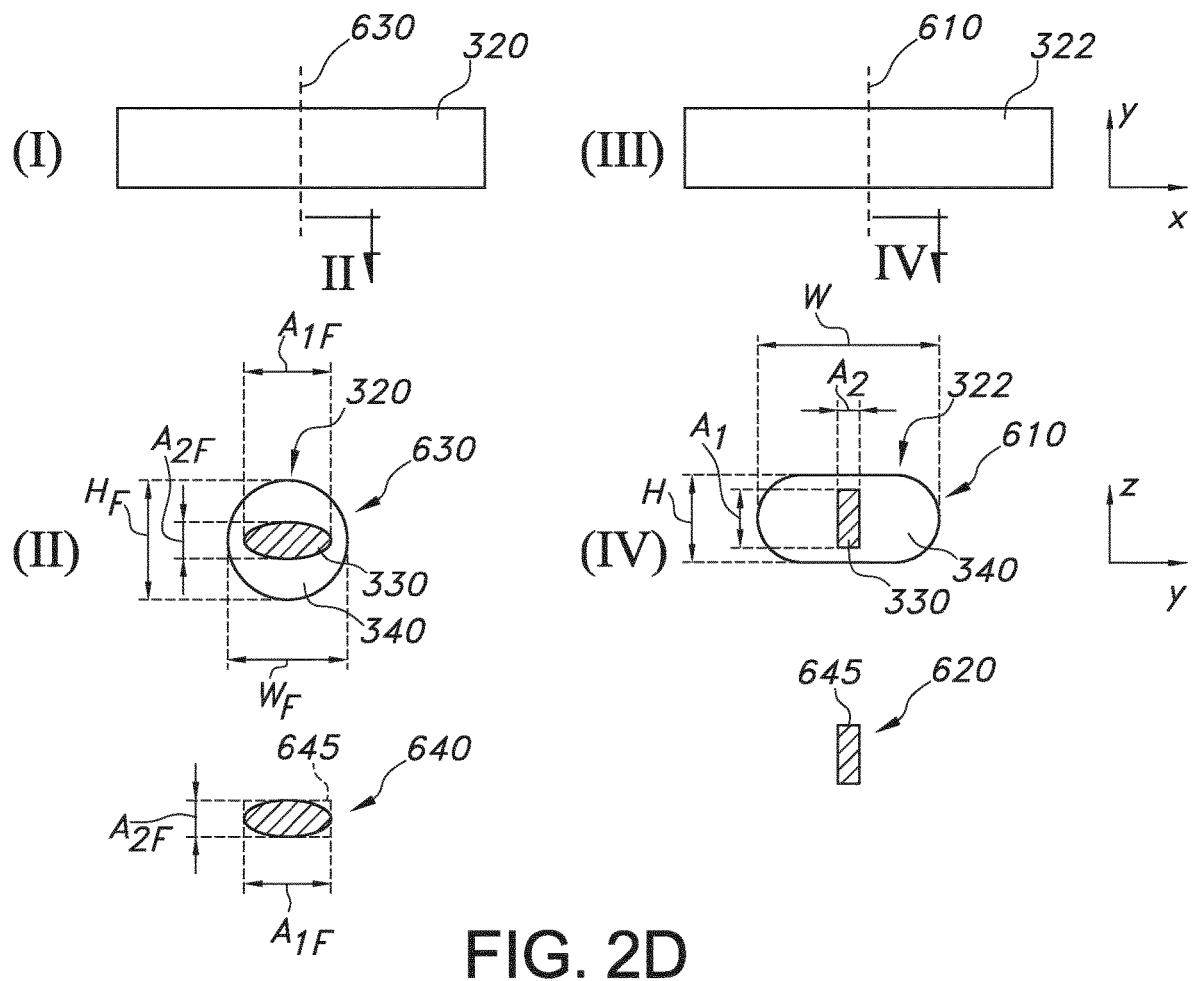

FIG. 2d schematically depicts (I) a top view of the filament 320, (II) a filament cross-sectional plane 630 of the filament 320, (III) a top view of the core-shell layer 1322, and (IV) a cross-sectional plane 610 of the core-shell layer 1322. The filament cross-sectional plane 630 comprises the filament width $W_F$ and the filament height $H_F$. The filament cross-sectional plane further provides a filament core cross-section 640, wherein the filament core cross-section 640 has a first filament core dimension $A_{1F}$, which is the longest dimension of a smallest circumscribing rectangle 645 of the filament core cross-section 640. The filament core cross-section comprises a second filament core dimension $A_{2F}$, perpendicular to the first filament core dimension $A_{1F}$, providing a second filament aspect ratio $AR_{2F}$, wherein $AR_{2F}=A_{1F}/A_{2F}$. In embodiments, $AR_{2F}/AR_{1F}>1$, especially wherein $AR_{2F}/AR_{1F}\geq 1.5$, more especially wherein $AR_{2F}/AR_{1F}\geq 2$. In embodiments, $3 \leq AR_{2F} \leq 10,000$. In embodiments, $0.5 \leq A_{1F}/W_F \leq 1$.

The cross-sectional plane 610 comprises the layer width W and the layer height H, providing a first aspect ratio $AR_1$, wherein $AR_1=W/H$. In embodiments $AR_1 \geq 1$, such as $AR_1 > 1$, like at least 1.2. The layer cross-sectional plane further provides a core cross-section 620, wherein the core cross-section 620 has a first dimension $A_1$, which is the longest dimension of a smallest circumscribing rectangle 645 of the core cross-section 620. The core cross-section comprises a second dimension $A_2$, perpendicular to the first dimension $A_1$, providing a second aspect ratio $AR_2$, wherein $AR_2 = A_1/A_2$. In embodiments, $AR_2/AR_1 \geq 1.2$, especially wherein $AR_2/AR_1 \geq 1.5$, more especially wherein $AR_2/AR_1 \geq 2$.

Figure 3A:
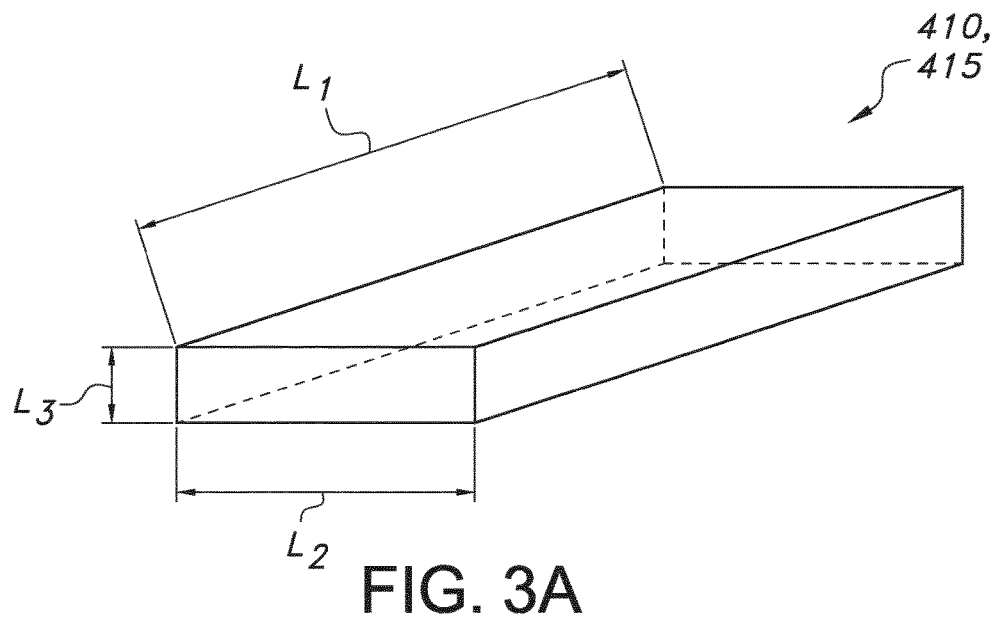
FIGS. 3a-3b schematically depict some aspects of embodiments of particles.
Figure 3B:
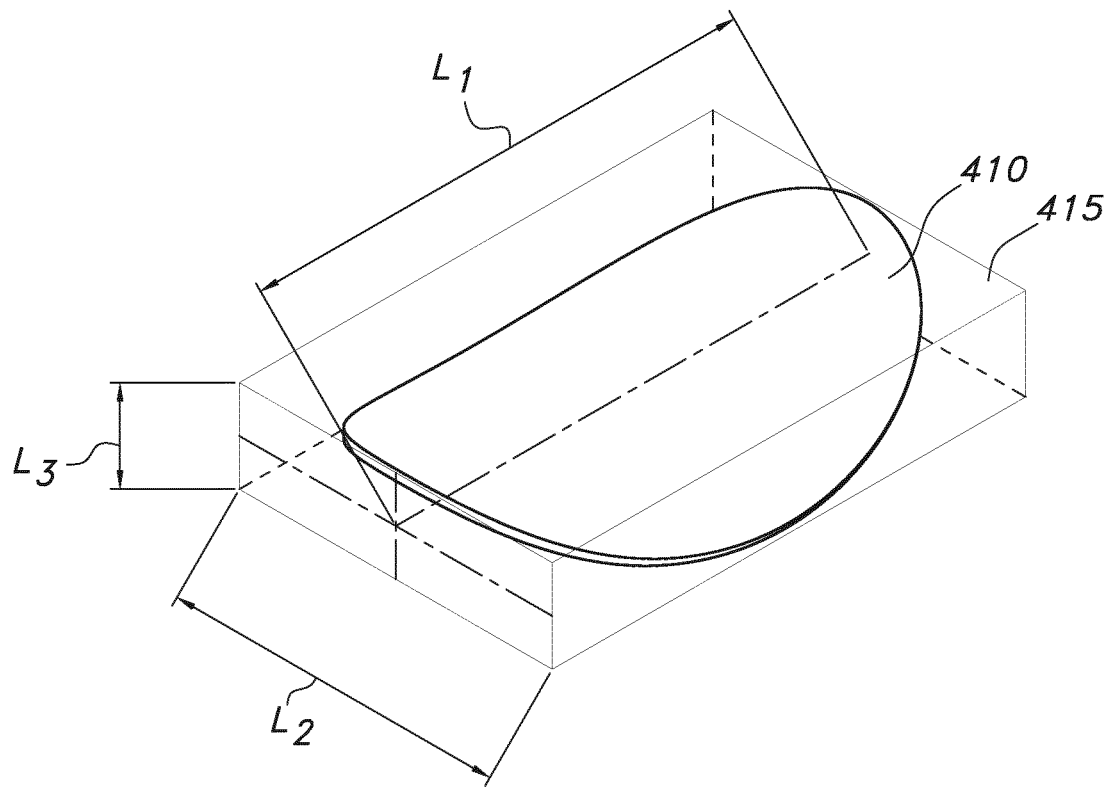

FIGS. 3a-b schematically depict embodiments of particles 410. Such particles 410 may in embodiments be embedded in core material 331. Additionally or alternatively, particles 410 may be used as to cover (part of) the core 330. FIG. 3b depicts a particle 410 that has a rectangular prism shape, wherein a virtual smallest rectangular prism 415 enclosing the particle 410 has a length $L_1$, a width $L_2$ and a height $L_3$ wherein $L_1 \geq L_2 \geq L_3$. FIG. 3c schematically depicts a particle that has a curved shape, with a virtual smallest rectangular prism 415 enclosing the particle. The rectangular prism 415 has a length $L_1$, a width $L_2$ and a height $L_3$ wherein $L_1 \geq L_2 \geq L_3$.

Further, note that the particles are not essentially oval or rectangular prismoids. Of course, the particles may comprise a combination of differently shaped particles.

FIG. 4 schematically depicts embodiments of the 3D item of the invention. The depicted embodiments comprise a single walled 3D item 1 comprising 3D printed material 202, wherein the 3D item 1 comprises a plurality of layers 322 of 3D printed material 202. at least part of one of the layers 322 may comprise a core-shell layer 1322 of 3D printed material 202; wherein the core-shell layer 1322 comprises (i) a core 330 comprising a core material 331, and (ii) a shell 340 comprising a 3D printed shell material 1362. In the depicted embodiments, the shell 340 may at least partly enclose the core 330. In embodiments, the core material 331 may be one or more of (i) reflective, (ii) transmissive, (iii) absorbing, and (iv) luminescent for light having a wavelength in the visible wavelength range. In embodiments, the 3D printed shell material 1362 may be light 21 transmissive for the wavelength in the visible wavelength range. The core-shell layer 1322 has a layer width W and a layer height H and a first aspect ratio $AR_1$, wherein $AR_1 = W/H$. In embodiments $AR_1 \geq 1$, such as $AR_1 > 1$, like at least 1.2. A cross-sectional plane 610 of the core-shell layer 1332 comprises the layer width W and the layer height H, and the core 330 provide a core cross-section 620. The core cross-section 620 has a first dimension $A_1$, which is the longest dimension of the smallest rectangle circumscribing the core cross-section 620, and a second dimension $A_2$, perpendicular to the first dimension $A_1$. The first dimension $A_1$ and second dimension $A_2$ provide a second aspect ratio $AR_2$, wherein $AR_2 = A_1/A_2$. In specific embodiments, $AR_2/AR_1 \geq 1.2$, especially wherein $AR_2/AR_1 \geq 1.5$, more especially wherein $AR_2/AR_1 \geq 2$.

FIG. 4 further schematically depicts the optical effect of varying the mutual angle $\alpha_1$ between the first dimension $A_1$ and the layer width W. In embodiments, the 3D printing stage further comprises: controlling optical properties of the 3D item 1 by controlling a mutual angle $\alpha_1$ between the first dimension $A_1$ and the layer width W. The 3D printing stage may comprise one or more of (i) a first stage and (ii) a second stage. In embodiments, in the first stage $0° \leq \alpha_1 \leq 20°$, especially wherein $0° \leq \alpha_1 \leq 10°$. In embodiments, in the second stage $70° \leq \alpha_1 \leq 90°$ especially wherein $80° \leq \alpha_1 \leq 90°$.

Figure 4A:
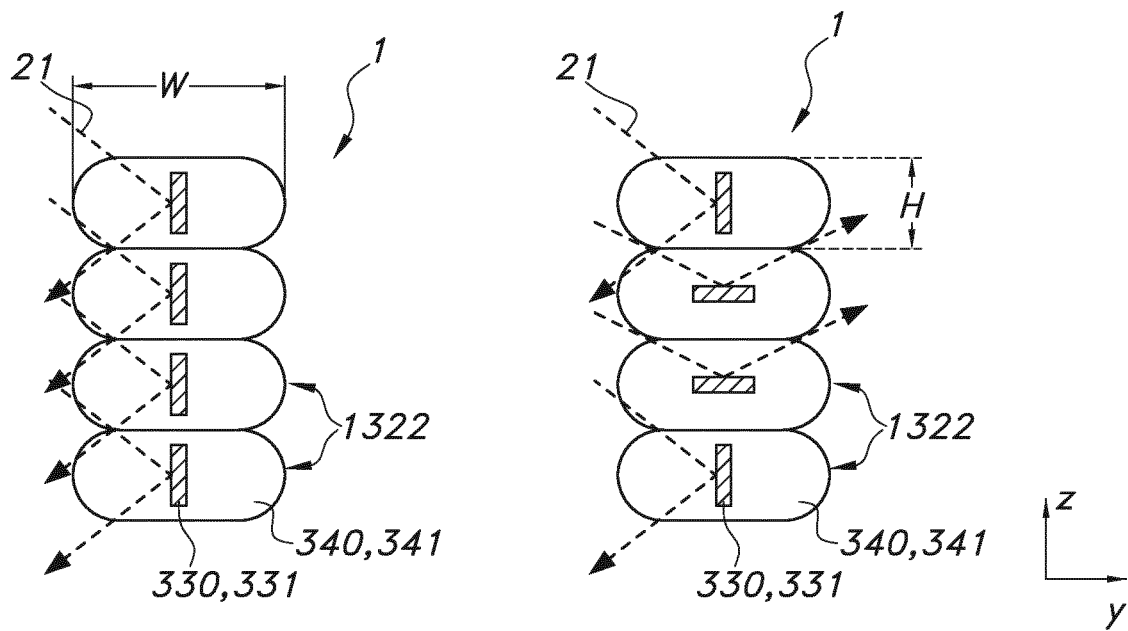
FIGS. 4a-4b schematically depict some aspects of embodiments of items of the invention.

In the depicted embodiment of FIG. 4a the core material 331 may be specular reflective and the 3D printable shell material may be transparent. (I) all four layers 322 of the 3D item 1 are printed according to the second stage. The cores 330 of the core-shell layers 1322 are aligned such that the 3D item 1 comprises a light 21 reflective surface. In the depicted embodiment of FIG. 4a (II), the top layer and the bottom layer 322 of the 3D item 1 are printed according to the second stage, whereas the middle two layers 322 are printed according to the first stage. In specific embodiments, the method may further comprise a rotating stage comprising: rotating the core 330 or filament 320 in a printer nozzle 502 in a synchronized manner with controlling the mutual angle $\alpha_1$, wherein the 3D printing stage and rotating stage at least partly overlap in time.

Figure 4B:
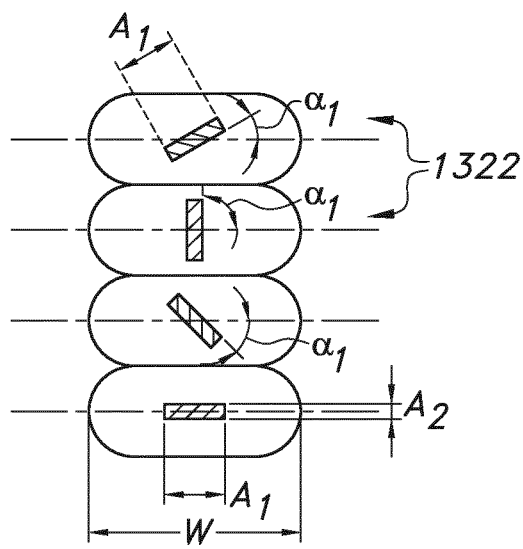
Figure 4B:
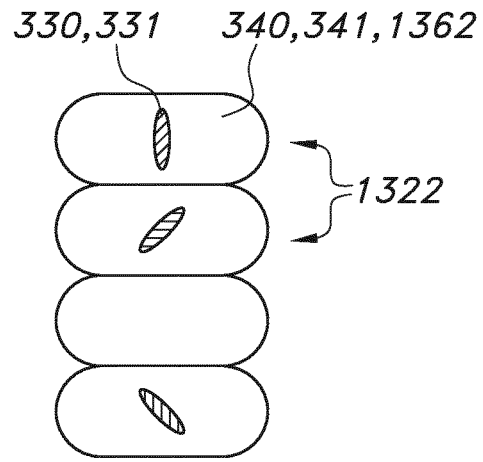
Figure 4B:
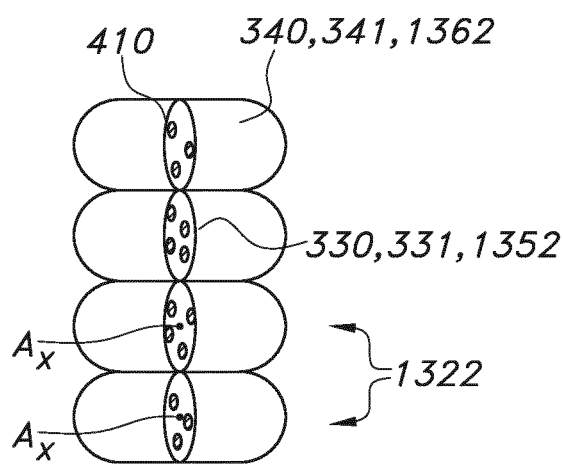
Figure 4B:
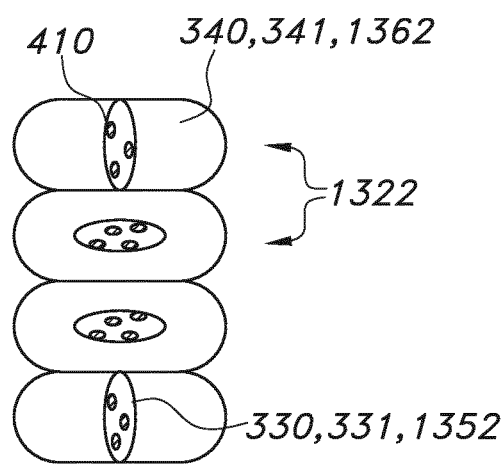

FIG. 4b schematically depicts some embodiments of the invention. (I) The core material may be a non-3D printable material. The mutual angle $\alpha_1$ is indicated for each core-shell layer 1322. The mutual angle $\alpha_1$ may be defined as the smallest angle between the first dimension $A_1$ and the layer width W. Hence, the mutual angle $\alpha_1$ may be $0° \leq \alpha_1 \leq 90$. The core may have different shapes. (II) In embodiments, the mutual angle $\alpha_1$ may be different for different layers. Additionally or alternatively, (part of) a layer may comprise no core material 331. (III) The core material 331 may be 3D printed material 1352. In embodiments, the 3D printable core material may comprise particles 410. The particles 410 may be one or more of light 21 absorbing, light 21 reflecting, light 21 transmitting, and luminescent for light 21. In embodiments, the mutual angle $\alpha_1$ may be identical for all layers 322. (IV) In embodiments, the mutual angle $\alpha_1$ may be varied amongst the layers. In embodiments, in at least part of the 3D item 1 $2 \leq AR_2 \leq 10,000$ may apply. In embodiments, in at least part of the 3D item 1 $0.5 \leq A_1/W \leq 1$ may apply.

Figure 5:
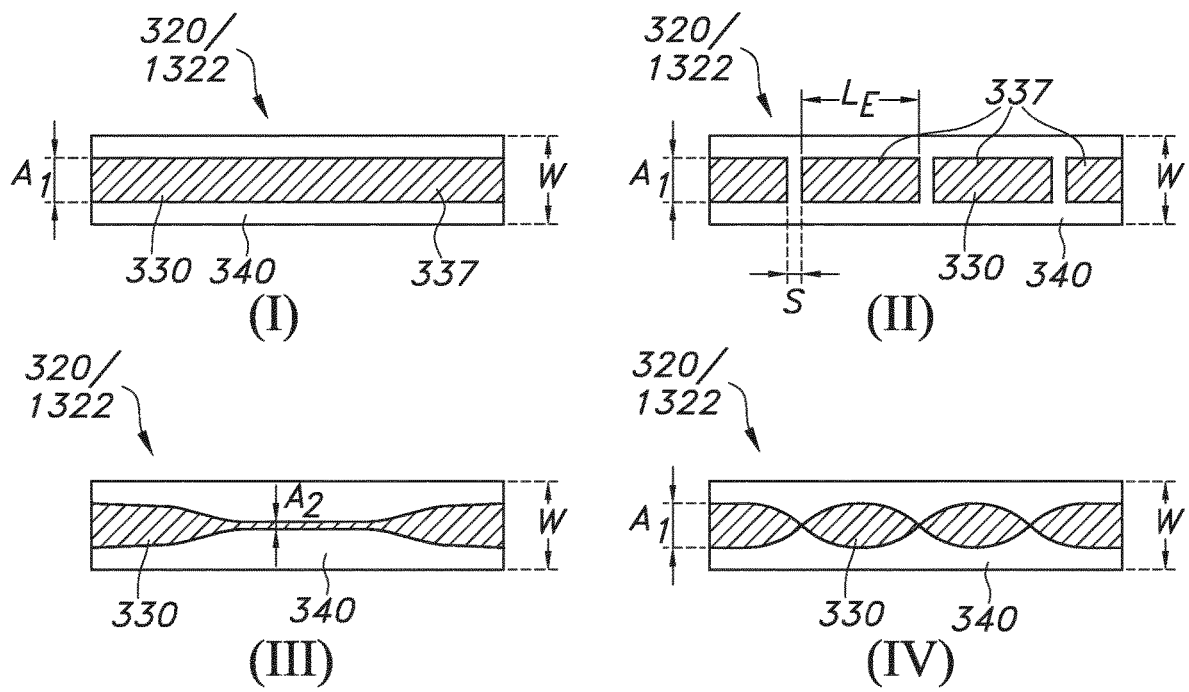
FIG. 5 schematically depicts some further aspects of the invention.

FIG. 5 schematically depicts some further embodiments of the invention, which may be applied to one or more of the filament 320 and the core-shell layer 1322 and hence the 3D printed item 1. In embodiments, the core material 331 may comprise one or more of (i) a strip-like element 337 comprising metal, (ii) a strip-like element 337 comprising a foil, (iii) a strip-like element 337 comprising a thermosetting polymer, (iv) a flexible strip-like element 337 (v) a specular reflective material, and (vi) a support with reflective flake-like particles 410. (I) The core 330 may comprise a (flexible) strip-like element 337 having an element length $L_E$ of at least W. In embodiments, the strip-like element 337 may comprise metal. (II) The core 330 may comprise serially arranged strip-like elements 337 each having an element length $L_E$ individually selected from the range of at least the layer width W. In embodiments, $L_E \geq 3*A_1$. Additionally or alternatively, the spacing distance S between two neighboring strip-like elements 337 may comprise $S \leq 10*L_E$. In embodiments, the strip-like element 337 may be flexible. (III) In embodiments, the 3D printed item 1 may comprises one or more of (i) a first part and (ii) a second part. In embodiments, in the first part $0° \leq \alpha_1 \leq 20°$, especially wherein $0° \leq \alpha_1 \leq 10°$, and wherein in the second part $70° \leq \alpha_1 \leq 90°$, especially wherein $80° \leq \alpha_1 \leq 90°$. (IV) In embodiments, the core 330 may be twisted. Essentially, the mutual angle $\alpha_1$ may be steadily changed. This may provide sparkling effects to the 3D item 1.

Figure 6:
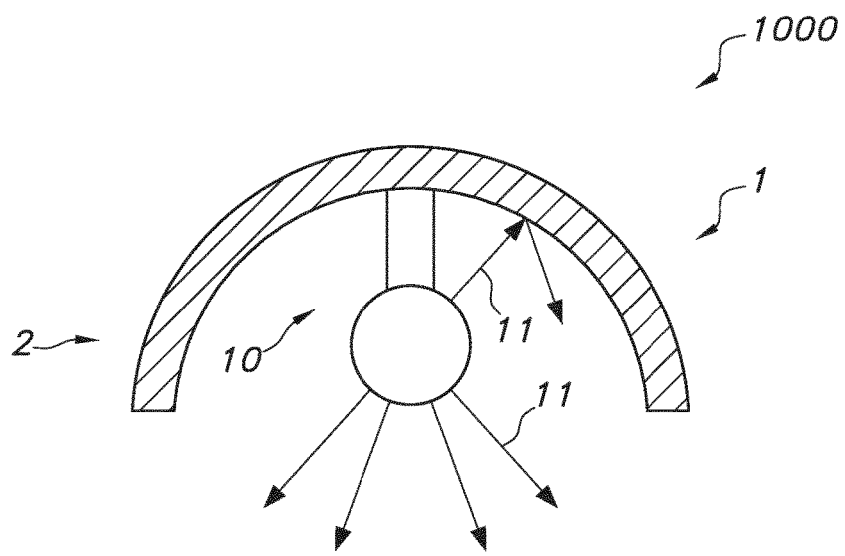
FIG. 6 schematically depicts an application.

FIG. 6 schematically depicts an embodiment of a lamp or luminaire, indicated with reference 2, which comprises a light source 10 for generating light 11. The lamp may comprise a housing or shade or another element, which may comprise or be the 3D printed item 1. Here, the half sphere (in cross-sectional view) schematically indicates a housing or shade. The lamp or luminaire may be or may comprise a lighting device 1000 (which comprises the light source 10). Hence, in specific embodiments the lighting device 1000 comprises the 3D item 1. The 3D item 1 may be configured as one or more of (i) at least part of a lighting device housing, (ii) at least part of a wall of a lighting chamber, and (iii) an optical element. Hence, the 3D item may in embodiments be light reflective for light source light 11 and/or transmissive for light source light 11. Here, the 3D item may e.g. be a housing or shade.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. . . . Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention describes FDM manufactured specular reflective surfaces. It may be desirable to have a 3D printer filament comprising a specular reflecting surface. In embodiments, the method may comprise core-shell 3D printing wherein (i) the shell may be a transparent thermoplastic polymer and (ii) the core may be a high-aspect ratio specular reflective layer. The high aspect ratio specular reflective layer may comprise a thin (e.g. aluminum/silver) reflective layer (e.g. applied by physical vapor deposition or using aligned specular reflecting high-aspect ratio flakes) on top of a polymer layer. The high aspect ratio specular reflective layer may comprise a metal strip. The polymer layer may comprise a thermoplastic polymer e.g. polycarbonate. The high-aspect ratio specular reflective layer may especially be flat. The polymer layer may be flexible. Eventually the stacked 3D printed layers may be aligned such that a large specular reflecting mirror may be obtained. In embodiments, the layer may be twisted in the 3D printed object for obtaining elongated sparkling effects.

In embodiments, the first dimension ($A_{1F}$) of the high aspect ratio specular reflective layer may be in the range from 0.5 to 1 times the width $W_F$ of the filament. In specific embodiments, $0.8 \leq A_{1F}/W_F \leq 1$, especially $0.9 \leq A_{1F}/W_F \leq 1$, more especially $0.95 \leq A_{1F}/W_F \leq 1$. In embodiments, $AR_{2F} \geq 2$, such as $AR_{2F} \geq 3$, especially $AR_{2F} \geq 4$, more especially $AR_{2F} \geq 5$.

In embodiments, the 3D printer nozzle may rotate accordingly such that layers within a stack of layers are aligned to obtain aligned layers. Especially a way that aligned cores may be obtained. In embodiments the reflectivity and transmission may be controlled locally.

In embodiments, the core and shell may be combined in the printer (nozzle).

In embodiments, the method may comprise a high-aspect ratio diffuse reflective or a light-absorbing layer. In embodiments, the major surfaces of the core may also differ in color.

In embodiments, the core may extend over the complete length of the filaments or over sections of the length of the filament.

The invention claimed is:

1. A method for producing a 3D item by means of fused deposition modelling, the method comprising a 3D printing stage, wherein the 3D printing stage comprises layer-wise depositing 3D printable material to provide the 3D item comprising 3D printed material on a receiver item, wherein:
during at least part of the 3D printing stage the 3D printable material comprises core material and 3D printable shell material; wherein the 3D item comprises a core-shell layer of the 3D printed material, wherein the core-shell layer comprises (i) a core comprising core material and (ii) a shell comprising 3D printed shell material; wherein the shell at least partly encloses the core;
the core material is one or more of (i) reflective, (ii) transmissive, (iii) absorbing, and (iv) luminescent for light having a wavelength in the visible wavelength range;
the 3D printable shell material is transmissive for the wavelength in the visible wavelength range;
the core-shell layer has a layer width (W) and a layer height (H) and a first aspect ratio $AR_1$, wherein $AR_1=W/H$, wherein $AR_1>1$;
a cross-sectional plane of the core-shell layer, wherein the cross-sectional plane comprises the layer width and the layer height (H), and the core provide a core cross-section, wherein the core cross-section has a first dimension ($A_1$), which is the longest dimension of the core cross-section, and a second dimension ($A_2$), perpendicular to the first dimension, providing a second aspect ratio $AR_2$, wherein $AR_2=A_1/A_2$, wherein $2 \leq AR_2 \leq 10,000$; and wherein $AR_2/AR_1 \geq 1.5$,
wherein the core comprises two or more strip-like elements, wherein each of the two or more strip-like elements has an element length individually selected from the range of at least the layer width, wherein $L_E \geq 3*A_1$, and wherein the spacing distance between two neighboring strip-like elements $S \leq 10*L_E$.

2. The method according to claim 1, wherein during at least part of the 3D printing stage the 3D printing stage comprises feeding an elongated strip-like element to a nozzle of a fused deposition modelling printer, wherein the fused deposition modelling 3D printer further comprises a cutting device configured to control a length of the strip-like element.

3. The method according to claim 1, wherein each of the two or more strip-like elements comprises one or more of a metal, a foil, a thermosetting polymer, a specular reflective material, and a support with reflective flake-like particles.

4. The method according to claim 1, wherein the 3D printing stage further comprises: controlling optical properties of the 3D item by controlling a mutual angle between the first dimension and the layer width, wherein the 3D printing stage comprises one or more of a first stage and a second stage, wherein in the first stage $0° \leq \alpha_1 \leq 20°$, and wherein in the second stage $70° \leq \alpha_1 \leq 90°$.

5. A filament for producing a 3D item by means of fused deposition modelling, the filament comprising: a core comprising a core material, and a shell comprising a printable shell material, wherein
the core material is one or more of reflective, transmissive, absorbing, and luminescent for light having a wavelength in the visible wavelength range;
the 3D printable shell material is light transmissive for the wavelength in the visible wavelength range;
the filament has a filament width and a filament height and a first filament aspect ratio $AR_{1F}$, wherein $AR_{1F}=W_F/H_F$, wherein $AR_{1F}>1$;
a filament cross-sectional plane of the filament, wherein the filament cross-sectional plane comprises the filament width and the filament height, and the core, provide a filament core cross section, wherein the filament core cross-section has a first filament core dimension ($A_1$), which is the longest dimension, and a second filament core dimension, perpendicular to the first filament core dimension, providing a second filament aspect ratio $AR_{2F}$, wherein $AR_{2F}=A_{1F}/A_{2F}$, wherein $2 \leq AR_{2F} \leq 10,000$; and wherein $AR_{2F}/AR_{1F} \geq 1.5$,
wherein the core comprises serially arranged strip-like elements each having an element length individually selected from the range of at least the layer width, wherein $L_E>3*A_1$, wherein the strip-like element comprises a metal strip-like element.

6. A 3D item comprising 3D printed material, wherein the 3D item comprises a plurality of layers of 3D printed material, wherein:
at least one of the layers comprises a core-shell layer of 3D printed material; wherein the core-shell layer comprises a core comprising a core material, and a shell comprising a 3D printed shell material; wherein the shell at least partly encloses the core;
the core material is one or more of reflective, transmissive, absorbing, and luminescent for light having a wavelength in the visible wavelength range;
the 3D printed shell material is light transmissive for the wavelength in the visible wavelength range;
the core-shell layer has a layer width and a layer height and a first aspect ratio $AR_1$, wherein $AR_1=W/H$, wherein $AR_1>1$;
a cross-sectional plane of the core-shell layer, wherein the cross-sectional plane comprises the layer width and the layer height, and the core provide a core cross-section, wherein the core cross-section has a first dimension, which is the longest dimension of the core cross-section, and a second dimension, perpendicular to the first dimension, providing a second aspect ratio $AR_2$, wherein $AR_2=A_1/A_2$, wherein $2 \leq AR_2 \leq 10,000$; and wherein $AR_2/AR_1 \geq 1.5$,
wherein in at least part of the 3D item the core comprises serially arranged strip-like elements each having an element length of at least the layer width, and wherein in at least part of the 3D item $2 \leq AR_2 \leq 10,000$ applies; and
wherein the 3D item includes one or more of:
(1) each strip-like element comprises one or more or a metal, a foil, a thermosetting polymer, a specular reflective material, and a support with reflective particles, wherein $LE>2*W$,
(2) one or more of a first part and a second part, wherein in the first part $0° \leq \alpha 1 \leq 20°$, and wherein in the second part $80° \leq \alpha 1 \leq 100°$, wherein $\alpha 1$ is a mutual angle between the first dimension and the layer width, and
(3) one or more of the cores of the core-shell layers are aligned such that the 3D item comprises a light reflective surface.

7. A lighting device comprising the 3D item according to claim 6, wherein the 3D item is configured as one or more of at least part of a lighting device housing, at least part of a wall of a lighting chamber, and an optical element.

* * * * *